United States Patent
Kanemoto et al.

(10) Patent No.: US 9,086,043 B2
(45) Date of Patent: Jul. 21, 2015

(54) CONTROLLER FOR ENGINE STARTER

(71) Applicant: DENSO CORPORATION, Kariya, Aichi-pref. (JP)

(72) Inventors: Kyohei Kanemoto, Toyota (JP); Kenji Sunami, Obu (JP); Ryouta Nakamura, Handa (JP)

(73) Assignee: DENSO CORPORATION, Kariya (JP)

( * ) Notice: Subject to any disclaimer, the term of this patent is extended or adjusted under 35 U.S.C. 154(b) by 243 days.

(21) Appl. No.: 13/778,809

(22) Filed: Feb. 27, 2013

(65) Prior Publication Data

US 2013/0220256 A1 Aug. 29, 2013

(30) Foreign Application Priority Data

Feb. 29, 2012 (JP) .................................. 2012-44248

(51) Int. Cl.
  F02N 15/00 (2006.01)
  F02D 41/04 (2006.01)
  F02N 11/08 (2006.01)
  F02N 11/10 (2006.01)

(52) U.S. Cl.
  CPC ............ *F02N 15/00* (2013.01); *F02N 11/0825* (2013.01); *F02N 11/108* (2013.01); *F02N 2011/0874* (2013.01); *Y02T 10/48* (2013.01)

(58) Field of Classification Search
  CPC ....... F02D 29/02; F02D 41/22; F02D 41/042; F02D 41/065; F02N 11/10; F02N 11/0814; F02N 11/0848
  USPC ............... 701/102, 107, 112–114; 123/179.1, 123/179.3, 179.4, 179.24, 179.28, 185.5, 123/196 S, 198 D
  See application file for complete search history.

(56) References Cited

U.S. PATENT DOCUMENTS

| | | | |
|---|---|---|---|
| 7,665,438 B2* | 2/2010 | Hirning et al. | 123/179.3 |
| 2007/0227489 A1* | 10/2007 | Ando | 123/179.3 |
| 2010/0090526 A1 | 4/2010 | Itou | |
| 2010/0116236 A1 | 5/2010 | Yamaguchi et al. | |
| 2010/0256896 A1* | 10/2010 | Kitano et al. | 701/113 |
| 2010/0299053 A1* | 11/2010 | Okumoto et al. | 701/113 |
| 2011/0213525 A1 | 9/2011 | Kanemoto et al. | |
| 2012/0216768 A1* | 8/2012 | Nakamura | 123/179.3 |

FOREIGN PATENT DOCUMENTS

| | | |
|---|---|---|
| JP | 2001-236871 | 8/2001 |
| JP | 2004-360706 | 12/2004 |
| JP | 2005-180386 | 7/2005 |
| JP | 2006-322332 | 11/2006 |
| JP | 2006-322369 | 11/2006 |
| WO | WO 2006/123654 | 11/2006 |

* cited by examiner

*Primary Examiner* — John Kwon
*Assistant Examiner* — Johnny H Hoang
(74) *Attorney, Agent, or Firm* — Nixon & Vanderhye P.C.

(57) ABSTRACT

An engine starter controller for a vehicle equipped with an idle-stop controller includes a user-start circuit, an auto-start circuit, a switch, and a failure detector. The user-start circuit energizes a starter when a driver starts an engine. The auto-start circuit energizes the starter when the idle-stop controller automatically restarts the engine. The switch circuit switches an energization circuit for energizing the starter from the user-start circuit to the auto-start circuit after the user-start circuit starts to energize the starter by causing the auto-start circuit to energize the starter and by putting the user-start circuit into a forced state where the user-start circuit is forced to stop energizing the starter. The failure detector determines whether the auto-start circuit energizes the starter when the energization circuit is switched to the auto-start circuit.

8 Claims, 10 Drawing Sheets

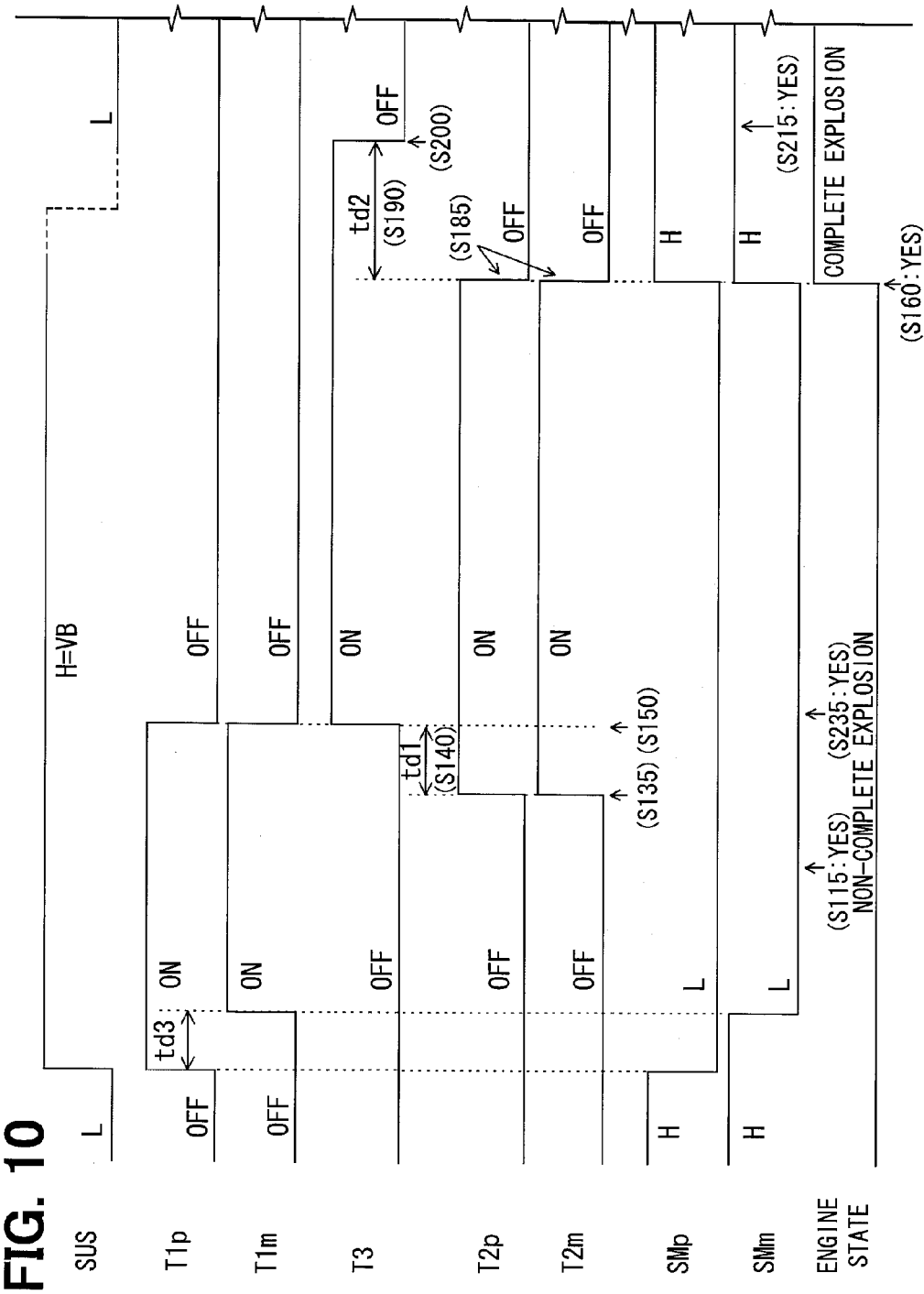

CONTROLLER FOR ENGINE STARTER

CROSS REFERENCE TO RELATED APPLICATION

This application is based on Japanese Patent Application No. 2012-44248 filed on Feb. 29, 2012, the contents of which are incorporated herein by reference.

FIELD

The present disclosure relates to a controller for a starter that cranks and starts an engine of a vehicle.

BACKGROUND

As disclosed, for example, in US 2010/0090526 corresponding to JP-A-2010-90874, a vehicle equipped with an automatic engine stop/start (i.e., stop/restart) system (so-called idle-stop system or idle-reduction system) has already been proposed. The idle-stop system automatically stops an engine of the vehicle when a predetermined automatic stop condition is met, and automatically restarts the engine when a predetermined automatic start condition is met.

The vehicle disclosed in US 2010/0090526 has two energization circuits for energizing an electrical load to drive an engine starter.

One energization circuit (hereinafter referred to as the "auto-start circuit") is used to automatically restart the engine, which was automatically stopped by a function of the idle-stop system, by the function. The other energization circuit (hereinafter referred to as the "user-start circuit") is used to start the engine in response to a start-up operation performed by a driver of the vehicle. That is, the user-start circuit is used when the driver starts the engine with his/her own intention. The duplication of energization circuits provides redundancy and improves reliability. Further, even when a power supply voltage is low, the user-start circuit allows the driver to start the engine.

In a vehicle equipped with an idle-stop system, it is important to check whether such an auto-start circuit works normally (i.e., whether the auto-start circuit energizes the electrical load of the starter normally) before the engine is automatically stopped.

Whether or not the auto-start circuit works normally can be determined by actually causing the auto-start circuit to work. However, the auto-start circuit cannot energize the electrical load when there is no need to drive the engine.

Therefore, in a conventional engine starter controller, a failure in an auto-start circuit cannot be detected until the auto-start circuit actually works upon satisfaction of the automatic start condition after the engine, which is started in response to the user start-up operation, is automatically stopped.

SUMMARY

In view of the above, it is an object of the present disclosure to provide an engine starter controller in which a failure in an auto-start circuit for automatically restarting an engine of a vehicle is detected before the engine started in response to a user start-up operation performed by a driver of the vehicle is automatically stopped for the first time.

According to an aspect of the present disclosure, an engine starter controller is used for a vehicle equipped with an electrical load, a starter, a signal output circuit, and an idle-stop controller. When the electrical load is energized, the starter cranks and starts an engine of the vehicle. The signal output circuit outputs a user-start signal in response to a user start-up operation performed by a driver of the vehicle. The idle-stop controller automatically stops the engine when a predetermined automatic stop condition is met during operation of the engine, and then the idle-stop controller automatically restarts the engine when a predetermined automatic start condition is met. The engine starter controller includes a user-start circuit, an auto-start circuit, a switch circuit, a failure detection circuit. The user-start circuit receives the user-start signal and drives the starter upon reception of the user-start signal by performing an energization action to energize the electrical load. The auto-start circuit performs the energization action when the idle-stop controller automatically restarts the engine. The switch circuit switches an energization circuit for energizing the electrical load from the user-start circuit to the auto-start circuit after the user-start circuit starts the energization action by causing the auto-start circuit to perform the energization action and by putting the user-start circuit into a forced state where the user-start circuit is forced to stop the energization action. The failure detection circuit determines whether the auto-start circuit performs the energization action when the switch circuit switches the energization circuit from the user-start circuit to the auto-start circuit.

BRIEF DESCRIPTION OF THE DRAWINGS

The above and other objects, features, and advantages will become more apparent from the following description and drawings in which like reference numerals depict like elements. In the drawings:

FIG. 10 is a timing chart of the ECU according to the third embodiment.

DETAILED DESCRIPTION

An electronic control unit (ECU) as a starter controller according to embodiments of the present disclosure is described below.

First Embodiment

Figure 1:
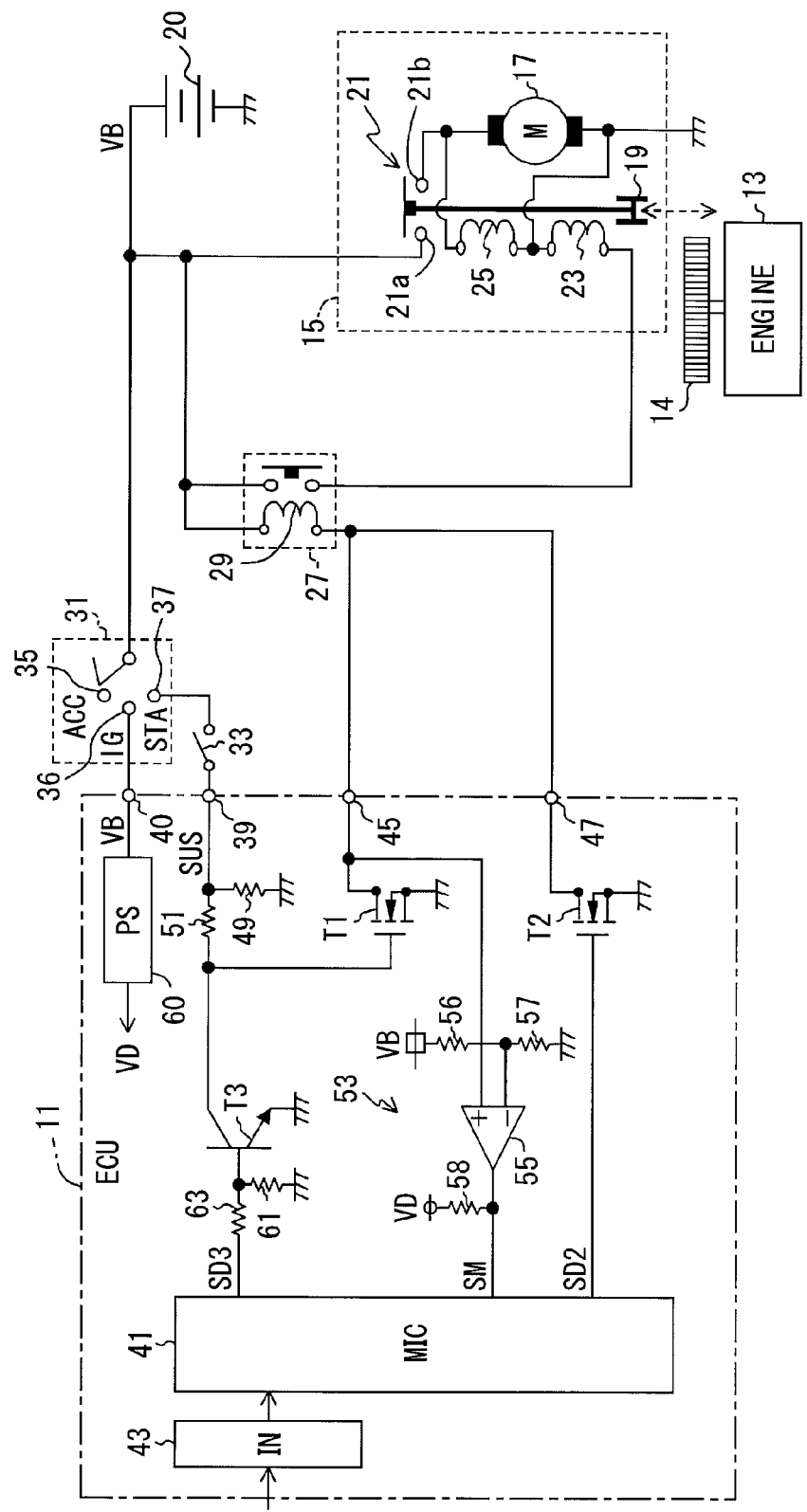
FIG. 1 is a diagram illustrating an electronic control unit (ECU) according to a first embodiment of the present disclosure.

FIG. 1 shows an ECU 11 according to a first embodiment of the present disclosure. The ECU 11 performs starter control that controls a starter 15. The starter 15 cranks and starts an engine 13 of a vehicle. The ECU 11 also performs idle-stop control that automatically stops the engine 13 and automatically restarts the engine 13. According to the first embodiment, the vehicle has an automatic transmission.

The starter 15 includes a starter motor 17, a pinion gear 19, a switch 21, a first solenoid coil 23, and a second solenoid coil 25. The motor 17 serves as a power source to crank the engine 13. The pinion gear 19 is driven and rotated by the motor 17. The switch 21 is provided in a first energizing path from a battery 20 as a power supply to the motor 17. The first and second solenoid coils 23 and 25 cause the switch 21 to be turned ON and cause the pinion gear 19 to move to a mesh position where the pinion gear 19 meshes with a ring gear 14 of the engine 13.

A first end of each of the first and second solenoid coils 23 and 25 is connected to a ground line. A second end of the second solenoid coil 25 is connected to the first energizing path from the battery 20 to the motor 17. A connection point at which the second end of the second solenoid coil 25 is connected to the first energizing path is located on the downstream side of the switch 21. That is, in the first energizing path, the switch 21 is connected between the battery 20 and the second end of the second solenoid coil 25, and the second end of the second solenoid coil 25 is connected between the switch 21 and the motor 17.

In the starter 15, when a battery voltage VB (e.g., 12 volts) outputted from the battery 20 is applied to a second end of the first solenoid coil 23, the first solenoid coil 23 is energized. Then, due to electromagnetic force generated in the first solenoid coil 23, the pinion gear 19 moves outside the starter 15 to mesh with the ring gear 14, and the switch 21 is turned ON (specifically, a pair of contacts 21a and 21b of the switch 21 is connected) so that the first energizing path from the battery 20 to the motor 17 can conduct.

Thus, the motor 17 is energized, and the second solenoid coil 25 is energized. As a result, electromagnetic force generated in the second solenoid coil 25 is added to the electromagnetic force generated in the first solenoid coil 23 so that force for moving the pinion gear 19 and force for tuning ON the switch 21 can be increased. The motor 17 is energized in a state where the pinion gear 19 meshes with the ring gear 14. Thus, rotary force (i.e., torque) of the motor 17 is transmitted through the pinion gear 19 to the ring gear 14 so that the engine 13 can be cranked.

In this way, when the first solenoid coil 23 is energized, the starter 15 operates to crank the engine 13. In contrast, when the first solenoid coil 23 is de-energized, the switch 21 is turned OFF, and the pinion gear 19 returns to an initial position (i.e., position of the pinion gear 19 in FIG. 1) by force of a biasing member (not shown), such as a spring, provided in the starter 15. The initial position is a position where the pinion gear 19 does not mesh with the ring gear 14.

In the vehicle, a relay 27 is provided outside the ECU 11. When the relay 27 is turned ON, the battery voltage VB is applied to the second end (i.e., upstream-side end) of the first solenoid coil 23 so that an electric current can flow through the first solenoid coil 23.

Specifically, the relay 27 includes a coil 29 and a pair of contacts. A first end of the coil 29 is supplied with the battery voltage VB, and a second end of the coil 29 is grounded (i.e., connected to the ground line) through the ECU 11. The pair of contacts is provided in a second energizing path from the battery 20 to the second end of the first solenoid coil 23. The relay 27 operates as follows. When the second end (i.e., downstream-side end) of the coil 29 is grounded through the ECU 11 so that the coil 29 can be energized, the pair of contacts is connected so that the second energizing path from the battery 20 to the first solenoid coil 23 can conduct (i.e., the second energizing path is ON). In contrast, when the coil 29 is de-energized, the pair of contacts is disconnected from each other so that the second energizing path from the battery 20 to the first solenoid coil 23 can be interrupted (i.e., the second energizing path is OFF).

Further, in the vehicle, an ignition key switch 31 and an inhibitor switch 33 are provided outside the ECU 11.

The key switch 31 is provided in an ignition key cylinder of a driver's seat. The key switch 31 includes an accessory power supply (ACC) terminal 35, an ignition power supply (IG) terminal 36, and a start signal (STA) terminal 37.

The key switch 31 operates as follows. When a key of the vehicle is inserted in the key cylinder and turned to an accessory position, a positive terminal of the battery 20 is connected to the ACC terminal 35. When the key is turned to an ignition position, the positive terminal of the battery 20 is connected to the IG terminal 36. When the key is turned to a start position, the positive terminal of the battery 20 is connected to the STA terminal 37.

The inhibitor switch 33 is turned ON when the automatic transmission is in parking position or neutral position. When the inhibitor switch 33 is turned ON, the STA terminal 37 of the key switch 31 is connected through the inhibitor switch 33 to a terminal 39 of the ECU 11.

When a driver of the vehicle performs the start-up operation by shifting the transmission into parking position or neutral position and by turning the key inserted in the key cylinder to the start position, the battery voltage VB is inputted to the terminal 39 of the ECU 11 from the STA terminal 37 of the key switch 31 through the inhibitor switch 33. According to the first embodiment, the battery voltage VB inputted to the terminal 39 acts as a user-start signal SUS.

A terminal 40 of the ECU 11 is supplied with the battery voltage VB from the IG terminal 36 of the key switch 31. The battery voltage VB supplied from the IG terminal 36 acts as an ignition power source in the vehicle. In other words, the battery voltage VB supplied from the IG terminal 36 acts as a battery voltage in an ignition system. The ECU 11 operates on the battery voltage VB supplied, as an external power source voltage, from the IG terminal 36 to the terminal 40.

Although not shown in the drawings, the ECU 11 receives information signals from sensors and performs the idle-stop control based on the information signals. Examples of the sensors that output the information signals can include a brake sensor which outputs a brake signal indicative of whether a brake pedal is depressed, a speed sensor which outputs a speed signal indicative of a speed of the vehicle, and a crankshaft or camshaft sensor which outputs a rotation signal.

Next, structure of the ECU 11 is described.

The ECU 11 includes a microcomputer 41, an input circuit 43, a terminal 45, a terminal 47, a transistor T1, and a transistor T2. The microcomputer 41 performs various processing for the idle-stop control and the starter control. The input circuit 43 allows the information signals to be inputted to the microcomputer 41. Each of the terminals 45 and 47 are connected to the second end (i.e., downstream side end) of the coil 29 of the relay 27. The transistor T1 is connected between the terminal 45 and the ground line in such a manner that first and second output terminals of the transistor T1 are respectively connected to the terminal 45 and the ground line. The transistor T2 is connected between the terminal 47 and the ground line in such a manner that first and second output terminals of the transistor T2 are respectively connected to the terminal 47 and the ground line.

According to the first embodiment, each of the transistors T1 and T2 is a MOSFET. The drain and source of the transistor T1 are respectively connected to the terminal 45 and the ground line. The drain and source of the transistor T2 are respectively connected to the terminal 47 and the ground line.

Therefore, when at least one of the transistors T1 and T2 is turned ON, the second end of the coil 29 of the relay 27 is connected to the ground line so that an electric current can flow through the coil 29. As a result, the relay 27 is turned ON so that the first solenoid coil 23 of the starter 15 can be energized. Thus, the starter 15 operates.

Further, the ECU 11 includes a pull-down resistor 49 and a resistor 51. The pull-down resistor 49 is connected between the terminal 39 and the ground line. A first end of the resistor 51 is connected to the terminal 39, and a second end of the resistor 51 is connected to the gate of the transistor T1.

Thus, in the ECU 11, the user-start signal SUS inputted to the terminal 39 is inputted as a first drive signal to the gate of the transistor T1 through the resistor 51. A drive signal SD2 is inputted to the gate of the transistor T2 from the microcomputer 41.

The ECU 11 further includes a monitor circuit 53 for failure detection. The monitor circuit 53 includes a comparator 55, a resistor 56, a resistor 57, and a pull-up resistor 58. A non-inverting input terminal (i.e., positive terminal) of the comparator 55 is connected to the drain of the transistor T1 and the terminal 45. The resistors 56 and 57 form a voltage divider. The voltage divider divides the battery voltage VB, which is the external power source voltage supplied from the IG terminal 36 of the key switch 31 through the terminal 40, and applies the divided voltage to an inverting input terminal (i.e., negative terminal) of the comparator 55. The divided voltage applied to the inverting input terminal of the comparator 55 acts as a threshold voltage of the comparator 55. For example, according to the first embodiment, the voltage divider constructed with the resistors 56 and 57 divides the battery voltage VB by two. The pull-up resistor 58 is connected between an output terminal of the comparator 55 and a line of a constant internal power supply voltage VD. For example, according to the first embodiment, the internal power supply voltage VD is five volts. An output signal of the comparator 55 is inputted as a monitor signal SM to the microcomputer 41.

The ECU 11 further includes a power supply circuit 60. The power supply circuit 60 generates the internal power supply voltage VD by stepping down the battery voltage VB, which is the external power source voltage supplied through the terminal 40. The microcomputer 41 operates on the internal power supply voltage VD.

The ECU 11 further includes a transistor T1 for forcibly turning OFF the transistor T1. According to the first embodiment, the transistor T3 is an NPN transistor. The collector and emitter of the transistor T3 are respectively connected to the gate of the transistor T1 and the ground line.

The ECU 11 further includes a pull-down resistor 61 and a resistor 63. The resistor 63 serves to limit a base current. The pull-down resistor 61 is connected between the base of the transistor T3 and the ground line. A first end of the resistor 63 is connected to the base of the transistor T3. A drive signal SD3 is supplied to a second end of the resistor 63 from the microcomputer 41. Thus, when the drive signal SD3 from the microcomputer 41 becomes a high level, the transistor T3 is turned ON so that the gate of the transistor T1 can be connected to the ground line through the transistor T3.

In the ECU 11, when the driver of the vehicle performs the starting operation, the user-start signal SUS is inputted to the terminal 39. In this case, if the transistor T3 remains OFF, the user-start signal SUS is supplied from the terminal 39 to the gate of the transistor T1 so that the transistor T1 can be turned ON. When the transistor T1 is turned ON, the relay 27 is turned ON so that the starter 15 can operate to crank the engine 13.

When the engine 13 is cranked by the starter 15, another ECU (hereinafter referred to as the "engine ECU") for controlling the engine 13 detects rotation of a crankshaft of the engine 13 and performs fuel injection and ignition for the engine 13. Thus, the engine 13 reaches a complete explosion state where the engine 13 is fully started. If the engine 13 is a diesel engine, the engine ECU performs only fuel injection without ignition.

When the microcomputer 41 turns ON the transistor T3 under a condition that the user-start signal SUS is inputted to the terminal 39, the gate of the transistor T1 is connected to the ground line so that the transistor T1 can be forcibly turned OFF.

Further, when the microcomputer 41 turns ON the transistor T2, the relay 27 is turned ON so that the starter 15 can operate.

When both of the transistors T1 and T2 are OFF, a voltage of the non-inverting input terminal of the comparator 55 becomes the battery voltage VB, which is greater than the threshold voltage, so that the monitor signal. SM, which is outputted from the comparator 55 to the microcomputer 41, can become a high level (i.e., become the internal power supply voltage VD). In contrast, when at least one of the transistors T1 and T2 is ON, the voltage of the non-inverting input terminal of the comparator 55 becomes less than the threshold voltage so that the monitor signal SM, which is outputted from the comparator 55 to the microcomputer 41, can become a low level (i.e., become 0V).

Figure 2A:
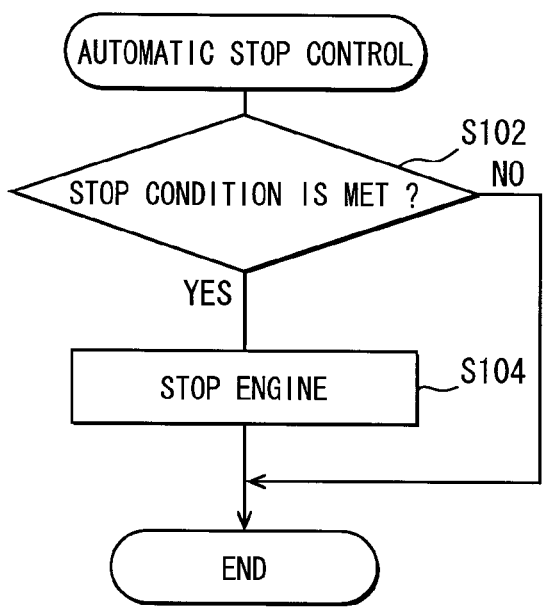
FIG. 2A is a flow chart of an automatic stop control process performed by the ECU according to the first embodiment.

Next, processes performed by the microcomputer 41 are described below. As part of the idle-stop control, the microcomputer 41 performs an automatic stop control process shown in FIG. 2A during operation (i.e., running) of the engine 13. For example, the automatic stop control process can be performed at a predetermined time interval.

The automatic stop control process starts at S102, where the microcomputer 41 determines whether a predetermined automatic stop condition is met. If the microcomputer 41 does determine that the automatic stop condition is met corresponding to NO at S102, the microcomputer 41 ends the automatic stop control process. In contrast, if the microcomputer 41 determines that the automatic stop condition is met corresponding to YES at S102, the automatic stop control process proceeds to S104. For example, when all the following three conditions are met, the automatic stop condition can be met. The first condition is that the speed of the vehicle is lower than a predetermined speed. The second condition is that the brake pedal remains depressed. The third condition is that an accelerator pedal remains undepressed.

At S104, the microcomputer 41 sends an engine stop command to the engine ECU. In response to the engine stop command, the engine ECU stops fuel injection to the engine 13 and interrupts supply of intake air to the engine 13, thereby automatically stopping the engine 13. After S104, the microcomputer 41 ends the automatic stop control process. Thus, the engine 13 is automatically stopped. In this way, when the engine 13 is automatically stopped, the engine 13 is in an idle-stop state.

Figure 2B:
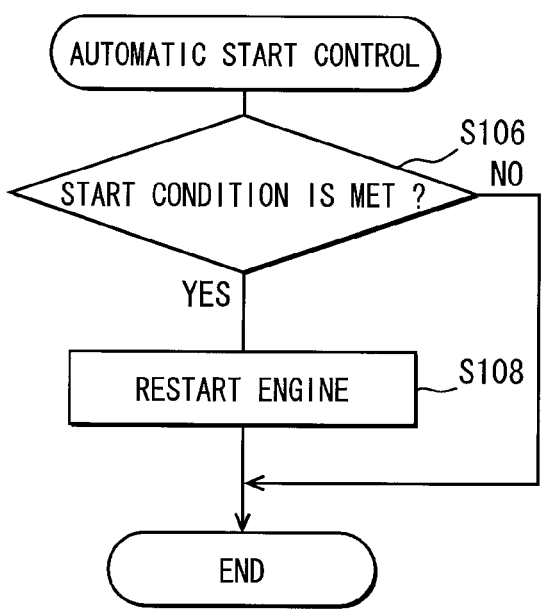
FIG. 2B is a flow chart of an automatic start control process performed by the ECU according to the first embodiment.

As part of the idle-stop control, the microcomputer 41 performs an automatic start control process shown in FIG. 2B during the idle-stop state of the engine 13. For example, the automatic start control process can be performed at a predetermined time interval.

The automatic start control process starts at S106, where the microcomputer 41 determines whether a predetermined automatic start condition is met. If the microcomputer 41 does determine that the automatic start condition is met corresponding to NO at S106, the microcomputer 41 ends the automatic start control process. In contrast, if the microcomputer 41 determines that the automatic start condition is met corresponding to YES at S106, the automatic start control process proceeds to S108. For example, when at least one of the following two conditions is met, the automatic stat condition can be met. The first condition is that the brake pedal is undepressed. The second condition is that the accelerator pedal is depressed.

At S108, the microcomputer 41 performs an automatic start procedure to restart the engine 13. Specifically, at S108, the microcomputer 41 drives the starter 15 by changing the drive signal SD2 supplied to the transistor T2 to a high level so that the transistor T2 can be turned ON. Thus, the starter 15 cranks the engine 13, and the engine ECU performs fuel injection and ignition for the engine 13. Then, the microcomputer 41 determines whether the engine 13 reaches the complete explosion state. When the microcomputer 41 determines that the engine 13 reaches the complete explosion state, the microcomputer 41 changes the drive signal SD2 to a low level so that the transistor T2 can be turned OFF.

For example, the microcomputer 41 can determine whether the engine 13 reaches the complete explosion state based on revolutions per minute (RPM) of the engine 13. The RPM of the engine 13 can be calculated from the rotation signal from the crankshaft or camshaft sensor. Alternatively, the microcomputer 41 can be notified by the engine ECU that the engine 13 reaches the complete explosion state. After S108, the microcomputer 41 ends the automatic start control process.

Figure 3:
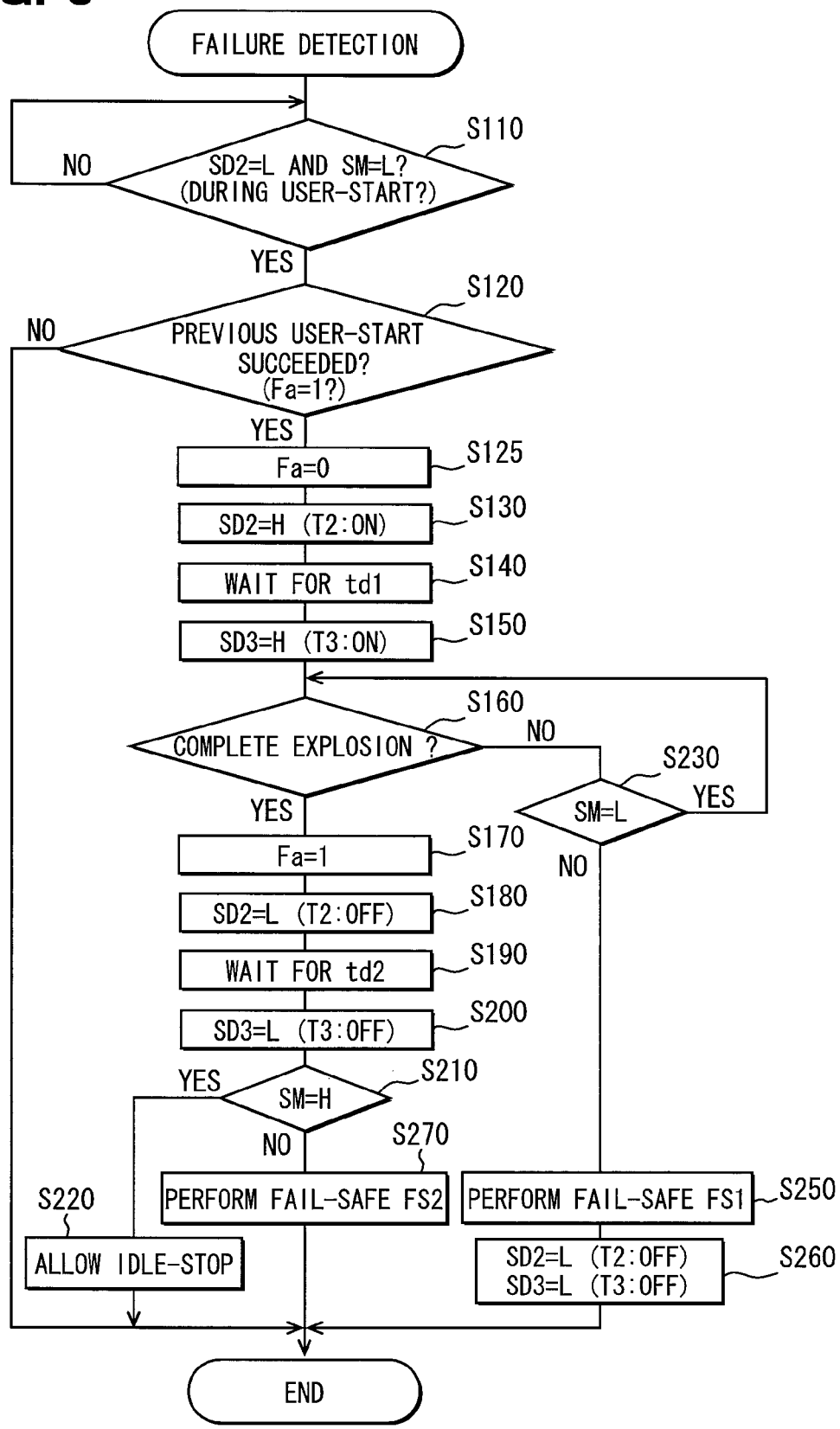
FIG. 3 is a flow chart of a failure detection process performed by the ECU according to the first embodiment.

The microcomputer 41 performs a failure detection process shown in FIG. 3 during a user-start where a user (i.e., driver) performs a start-up operation to start the engine 13.

In the ECU 11, when the key inserted in the ignition key cylinder is turned to the ignition position or the start position so that the battery voltage VB can be supplied from the IG terminal 36 of the key switch 31 to the terminal 40 of the ECU 11, the internal power supply voltage VD is outputted from the power supply circuit 60 so that the microcomputer 41 can be activated and perform the failure detection process shown in FIG. 3. When the microcomputer 41 is activated, each of the drive signal SD2 supplied to the transistor T2 and the drive signal SD3 supplied to the transistor T3 is initially set to a low level.

As shown in FIG. 3, the failure detection process starts at S110, where the microcomputer 41 determines whether it is, in the middle of (i.e., during) the user-start. That is, at S110, the microcomputer 41 determines whether the engine 13 is being started in response to the start-up operation performed by the user.

Specifically, the microcomputer 41 determines whether each of the drive signal SD2 supplied to the transistor T2 and the monitor signal SM supplied from the comparator 55 is at a low level. A fact that each of the drive signal SD2 and the monitor signal SM is at a low level indicates that the transistor T1 is turned ON by the user-start signal SUS from the terminal 36. If the microcomputer 41 determines that each of the drive signal SD2 the monitor signal SM is at a low level corresponding to YES at S110, the microcomputer 41 determines that it is in the middle of the user-start, and the failure detection process proceeds to S120.

At S120, the microcomputer 41 determines whether the previous user-start, which was performed when the previous user-start signal SUS was outputted, succeeded in starting the engine 13. If the microcomputer 41 determines that the previous user-start succeeded in starting the engine 13 corresponding to YES at S120, the failure detection process proceeds to S125.

Specifically, at S120, the microcomputer 41 refers to a flag Fa, which is set to "1" or "0". If the flag Fa remains set to "1", the microcomputer 41 determines that the previous user-start succeeded in starting the engine 13. For example, the flag Fa can be stored in a rewritable nonvolatile memory. Alternatively, the flag Fa can be stored in a backup RAM that retains stored data with continuous power supply.

At S125, the microcomputer 41 sets the flag Fa to "0".

Then, the failure detection process proceeds to S130, where the microcomputer 41 turns ON the transistor T2 by changing the drive signal SD2 to a high level. Then, the failure detection process proceeds to S140, where the microcomputer 41 waits for a predetermined waiting time td1. Then, the failure detection process proceeds to S150, where the microcomputer 41 turns ON the transistor T3 by changing the drive signal SD3 to a high level.

Before the transistor T3 is turned ON at S150, the transistor T1 is turned ON by the user-start signal SUS so that the relay 27 can be turned ON to energize the first solenoid coil 23 of the starter 15. When the transistor T3 is turned ON at S150, the transistor T1 is forcibly turned OFF. Instead, the transistor T2 is turned ON so that the energization of the first solenoid coil 23 can be continued.

It is noted that the waiting time td1 is set longer than a delay time from when the drive signal SD2 is changed to a high level until the transistor T2 is turned ON. In such an approach, it is ensured that the transistor T1 remains ON until the transistor T2 is turned ON. Accordingly, instantaneous interruption of power supply to the first solenoid coil 23 of the starter 15 is prevented so that the relay 27 can remain ON. Therefore, the starter 15 continues to operate after the user-start signal SUS is inputted to the ECU 11.

After S150, the failure detection process proceeds to S160, where the microcomputer 41 determines whether the engine 13 reaches the complete explosion state. If the microcomputer 41 does not determine that the engine 13 reaches the complete explosion state corresponding to NO at S160, the failure detection process proceeds to S230.

At S230, the microcomputer 41 determines whether the monitor signal SM from the comparator 55 is at a low level. If the microcomputer 41 determines that the monitor signal SM is at a low level corresponding to YES at S230, the microcomputer 41 determines that the transistor T2 remains ON normally, and the failure detection process returns to S160.

If the microcomputer 41 determines that the engine 13 reaches the complete explosion state corresponding to YES at S160, the failure detection process proceeds to S170. At S170, the microcomputer 41 determines that the presently user-start succeeded in starting the engine 13 and sets the flag Fa to "1".

Then, the failure detection process proceeds to S180, where the microcomputer 41 turns OFF the transistor T2 by changing the drive signal SD2 to a low level. Then, the failure detection process proceeds to S190, where the microcomputer 41 waits for a predetermined waiting time td2. Then, the failure detection process proceeds to S200, where the microcomputer 41 turns OFF the transistor T3 by changing the drive signal SD3 to a low level.

It is noted that the waiting time td2 is set longer than a general time from when the engine 13 reaches the complete explosion state until the driver returns the key inserted in the key cylinder from the start position to the ignition position. In such an approach, as of the time when the transistor T3 is turned OFF at S200 so that the transistor T1 can be allowed to be turned ON, the user-start signal SUS have not been inputted to the ECU 11 yet. Therefore, the transistor T1 is prevented from being turned ON again after the engine 13 reaches the complete explosion state. Accordingly, when the drive signal SD2 is changed to a low level at S180, the starter 15 stops operating.

After S200, the failure detection process proceeds to S210, where the microcomputer 41 determines whether the monitor signal SM from the comparator 55 is at a high level. If there is no failure, each of the transistors T1 and T2 remains OFF as of S210. If the microcomputer 41 determines that the monitor signal SM is at a high level corresponding to YES at S210, the microcomputer 41 determines that the transistor T2, which is used to automatically restart the engine 13, operates normally (i.e., determines that the transistor T2 is turned ON and OFF normally), and the failure detection process proceeds to S220.

At S220, the microcomputer 41 enables an idle-stop function that allows the engine 13 to be automatically stopped. Specifically, the microcomputer 41 allows the automatic stop control process shown in FIG. 2A or S104 of the automatic stop control process to be performed. After S220, the microcomputer 41 ends the failure detection process.

If the microcomputer 41 determines that the monitor signal SM is at a high level corresponding to NO at S230, the microcomputer 41 determines that the transistor T2, which was turned ON at S130, remains OFF due to a failure, and the failure detection process proceeds to S250.

At S250, the microcomputer 41 performs a predetermined fail-safe process FS1. For example, in the fail-safe process FS1, the microcomputer 41 can disable the idle-stop function to prohibit the automatic stop control process shown in FIG. 2A or S104 of the automatic stop control process from being performed. A reason for this is that once the engine 13 is automatically stopped, the engine 13 cannot be automatically restarted because the transistor T2 cannot be turned ON due to the failure.

Further, in the fail-safe process FS1, the microcomputer 41 can perform an alarm procedure to inform a user (in particular, a driver) of the vehicle of the failure. For example, the alarm procedure can illuminate an alarm indicator, activate an alarm buzzer, and/or produce a visible or audible message indicating, for example, that "There is a failure in a start-up system. Let your car undergo maintenance at dealerships". The visible message can be displayed on a display unit mounted on the vehicle, and the audible message can be outputted from a speaker mounted on the vehicle.

After S250, the failure detection process proceeds to S260, where the microcomputer 41 turns OFF the transistor T2 and the transistor T3 by changing the drive signal SD2 and the drive signal SD3 to a low level, respectively. Thus, the transistor T1 is allowed to be turned ON. Therefore, if the user-start signal SUS remains inputted to the ECU 11 as of S260, the transistor T1, which is designed to be used in the user-start, is turned ON so that starter 15 can operate. After S260, the microcomputer 41 ends the failure detection process.

If the microcomputer 41 determines that the monitor signal SM is at a low level corresponding to NO at S210, the microcomputer 41 determines that the transistor T2 remains ON due to a failure, and the failure detection process proceeds to S270.

At S270, the microcomputer 41 performs a predetermined fail-safe process FS2. For example, like in the fail-safe process FS1, in the fail-safe process FS2, the microcomputer 41 can disable the idle-stop function and/or perform the alarm procedure. A reason for disabling the idle-stop function is to protect the first and second solenoid coils 23 and 25 of the starter 15 from burnout due to continuous energization. If at least one of the first and second solenoid coils 23 and 25 burns out, the starter 15 cannot start the engine 13.

Further, in the fail-safe process FS2, the microcomputer 41 can perform an urge procedure to urge the driver not to stop the engine 13.

Specifically, the urge procedure can produce a visible or audible message indicating, for example, that "When an engine is stopped, there is a possibility that the engine cannot be restarted". For example, if the ECU 11 is mounted on a push-switch-type vehicle that has a push switch operated by the driver to start the engine 13, the urge procedure can prevent the engine 13 from being stopped unless the push switch remains pressed down for a period longer than usual.

After S270, the microcomputer 41 ends the failure detection process.

If the microcomputer 41 determines that the previous user-start fails in starting the engine 13 corresponding to NO at S120, the failure detection process ends. Although not shown in the flow chart of FIG. 3, when the previous user-start fails in starting the engine 13 corresponding to NO at S120, the microcomputer 41 performs the same processes as S160 and S170 before ending the failure detection process. In this case, if the microcomputer 41 determines that the engine 13 reaches the complete explosion state, the microcomputer 41 sets the flag Fa to "1".

Next, effect of the ECU 11 brought when the microcomputer 41 performs the failure detection process shown in FIG. 3 is described.

Firstly, a first case where the transistor T2 operates normally is described with reference to FIG. 4.

Figure 4:
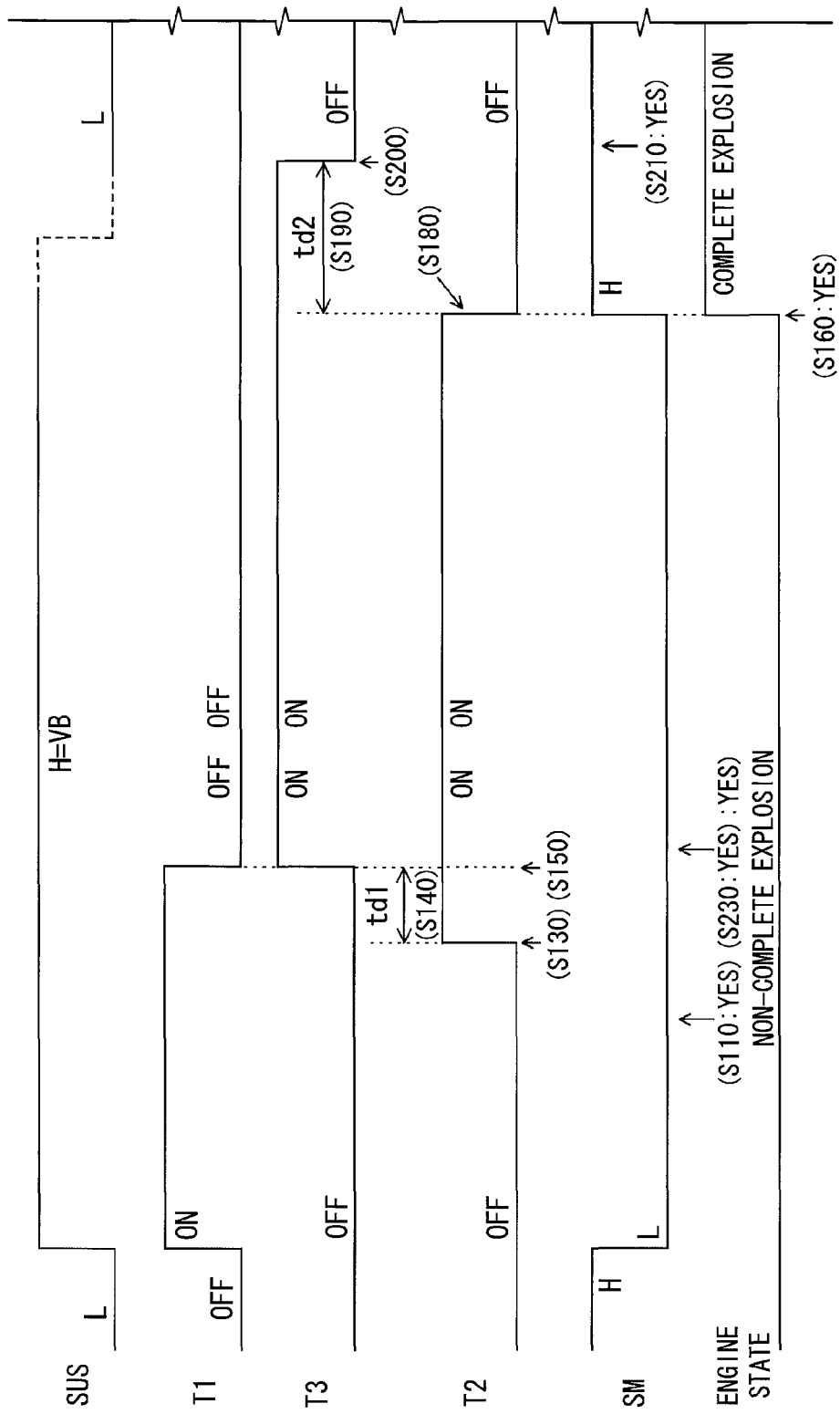
FIG. 4 is a first timing chart of the ECU according to the first embodiment.

As shown in FIG. 4, when the user-start signal SUS is inputted to the terminal 39 of the ECU 11 as a result of the start-up operation performed by the driver of the vehicle, the transistor T1 is turned ON. Then, the starter 15 operates to crank the engine 13. Then, the engine ECU detects the rotation of the crankshaft of the engine 13 and performs fuel injection and ignition for the engine 13.

It is noted that the driver turns the key inserted in the key cylinder to the ignition position before performing the start-up operation. Therefore, the microcomputer 41 is activated around the time when the user-start signal SUS is inputted to the ECU 11 and then starts to perform the failure detection process shown in FIG. 3.

In the ECU 11, when the transistor T1 is turned ON, the monitor signal SM outputted from the comparator 55 to the microcomputer 41 becomes a low level.

When the monitor signal SM becomes a low level, the microcomputer 41 determines that it is in the middle of the user-start (YES at S110 of FIG. 3) and turns ON the transistor T2 by changing the drive signal SD2 to a high level (at S130 of FIG. 3). Then, when the waiting time td1 elapses since the drive signal SD2 is changed to a high level (at S140 of FIG. 3), the microcomputer 41 turns ON the transistor T3 by changing the drive signal SD3 to a high level (at S150 of FIG. 3).

As a result, the transistor T1 is forcibly turned OFF. However, as of the time when the transistor T1 is forcibly turned OFF, the transistor T2 remains ON. Accordingly, the starter 15 continues to operate, and the monitor signal SM remains at a low level. Therefore, the microcomputer 41 determines that the monitor signal SM is at a low level (YES at S230 of FIG. 3). In this case, the microcomputer 41 determines that the transistor T2 can be turned ON normally (i.e., determines that the transistor T2 does not suffer from an OFF-failure that prevents the transistor T2 from being turned ON).

Then, when the engine 13 reaches the complete explosion state, the microcomputer 41 detects that the engine 13 reaches the complete explosion state (YES at S160 of FIG. 3) and turns OFF the transistor T2 by changing the drive signal SD2 to a low level (at S180 of FIG. 3). Then, when the waiting time td2 elapses since the drive signal SD2 is changed to a low level (at S190 of FIG. 3), the microcomputer 41 turns OFF the transistor T3 by changing the drive signal SD3 to a low level (at S200 of FIG. 3).

As of the time when the transistor T3 is turned OFF, the driver has already returned the key inserted in the key cylinder to the ignition position from the start position. Therefore, although the transistor T3 is turned OFF, the transistor T1 is not turned ON again.

When the drive signal SD2 becomes a low level so that the transistor T2 can be turned OFF, the monitor signal SM returns to a high level from a low level. Therefore, the microcomputer 41 determines that the monitor signal SM is at a high level (YES at S210 of FIG. 3). In this case, the microcomputer 41 determines that the transistor T2 can be turned OFF normally (i.e., determines that the transistor T2 does not suffer from an ON-failure that prevents the transistor T2 from being turned OFF).

Figure 5:
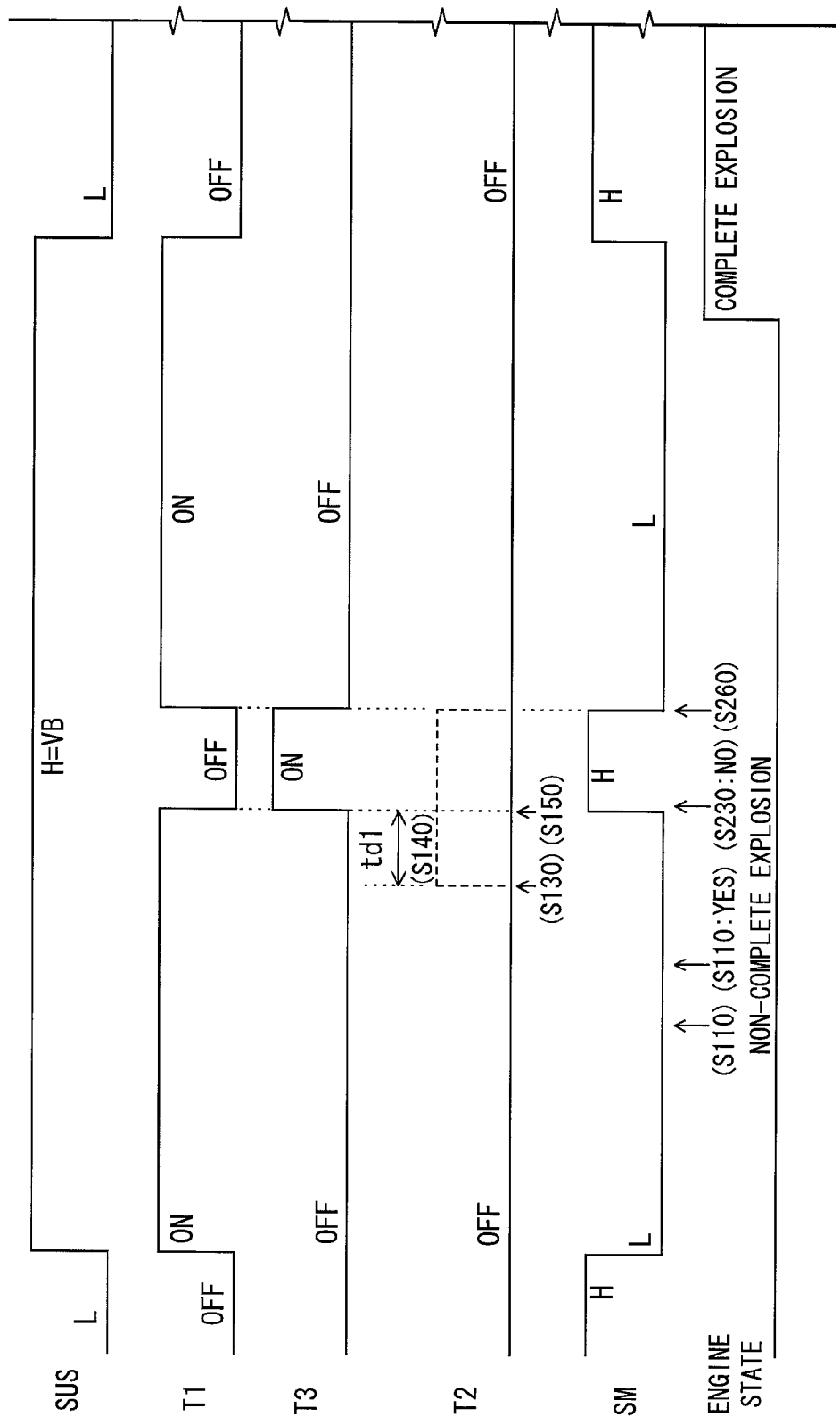
FIG. 5 is a second timing chart of the ECU according to the first embodiment.

Next, a second case where the transistor T2 suffers from the OFF-failure is described with reference to FIG. 5. A difference of the effect of the ECU 11 between in the first case and in the second case appears after the microcomputer 41 determines that it is in the middle of the user-start (YES at S110 of FIG. 3). Only the difference is described below.

Assuming that the transistor T2 suffers from the OFF-failure, even when the microcomputer 41 changes the drive signal SD2 to a high level at S130 of FIG. 3, the transistor T2 remains OFF.

Therefore, the monitor signal SM is changed from a low level to a high level, when the waiting time td1 elapses since the drive signal SD2 is changed to a high level (at S140 of FIG. 3), the microcomputer 41 turns ON the transistor T3 by changing the drive signal SD3 to a high level (at S150 of FIG. 3), and the transistor T1 is forcibly turned OFF.

As a result, the microcomputer 41 determines that the monitor signal SM is at a high level (NO at S230 of FIG. 3) and that the transistor T2 suffers from the OFF-failure. Then, the microcomputer 41 performs the fail-safe process FS1 (at S250 of FIG. 3).

Further, in this case, since the microcomputer 41 turns OFF the transistor T3 by changing not only the drive signal SD2 but also the drive signal SD3 to a low level (at S260 of FIG. 3), the transistor T1 is released from the forced-OFF state so that the transistor T1 can be allowed to be turned ON. That is, the transistor T1 returns to a normal state where the transistor T1 is turned ON according to the user-start signal SUS. Therefore, as shown in FIG. 5, if the user-start signal SUS remains inputted to the ECU 11 at the time when the transistor T1 returns to the normal state, the transistor T1 is turned ON again so that the starter 15 can operate.

When the starter 15 operates, the engine 13 reaches the complete explosion state. Then, when the driver returns the key inserted in the key cylinder to the ignition position from the start position, the input of the user-start signal SUS to the ECU 11 is stopped. As a result, the transistor T1 is turned OFF, and the monitor signal SM returns to a high level from a low level.

Although not shown in the drawings, in a third case where the transistor T2 suffers from the ON-failure, even after the microcomputer 41 performs S180, S190, and S200 of FIG. 3, the transistor T2 remains ON so that the monitor signal SM can remain at a low level. Accordingly, the microcomputer 41 determines that the monitor signal SM is at a low level corresponding to NO at S210 of FIG. 3. In this case, the microcomputer 41 determines that the transistor T2 suffers from the ON-failure and performs the fail-safe process FS2 (at S270 of FIG. 3).

In the ECU 11, when the microcomputer 41 detects that the transistor T1 is turned ON by the user-start signal SUS (YES at S110 of FIG. 3), the microcomputer 41 turns ON not only the transistor T2 but also the transistor T3 (at S130 of FIG. 3), thereby forcibly turning OFF the transistor T1 (at S150 of FIG. 3). Thus, the microcomputer 41 switches an energization transistor, which serves an energization circuit for energizing the coil 29 of the relay 27 and the first solenoid coil 23 of the starter 15, from the transistor T1 to the transistor T2. After performing the switching of the energization transistor, the microcomputer 41 determines whether the transistor T2 is normally turned ON based on the monitor signal SM from the comparator 55 (at S230 of FIG. 3).

That is, in the ECU 11, when the user-start is performed, the energization circuit is switched from the transistor T1 designed for the user-start to the transistor T2 designed for an auto-start. In such an approach, it is checked whether the transistor T2 can be turned ON by actually turning ON the transistor T2. Thus, determination whether the transistor T2 designed for the auto-start suffers from the OFF failure can be performed when the user-start is performed. In other words, the determination whether the transistor T2 designed for the auto-start suffers from the OFF failure can be performed before the engine 13, which has been started by the start-up operation performed by the user, is automatically stopped for the first time.

In this case, when the microcomputer 41 determines that the transistor T2 suffers from the OFF-failure (NO at S230 of FIG. 3), the microcomputer 41 turns OFF the transistor T3, thereby releasing the transistor T1 from the forced-OFF state (at S260 of FIG. 3). Therefore, even if the transistor T2 suffers from the OFF failure at the time of the user-start, the transistor T1 designed for the user-start can allow the starter 15 to operate to start the engine 13.

Further, when the microcomputer 41 determines that the transistor T2 suffers from the OFF-failure (NO at S230 of FIG. 3), the microcomputer 41 disables the idle-stop function (at S250 of FIG. 3), thereby prohibiting the engine 13 from being automatically stopped. Thus, it is possible to prevent the vehicle from being incapable of running while being stopped on a road.

Further, in the ECU 11, when the drive signal SD3 from the microcomputer 41 becomes a high level as an active level, the transistor T3 is turned ON and interrupts the supply of the user-start signal SUS to the gate of the transistor T1, thereby forcibly turning OFF the transistor T1. In this way, the microcomputer 41 forcibly turns OFF the transistor T1 by changing the drive signal SD3 supplied to the transistor T3 to a high level. Further, according to the first embodiment, when the microcomputer 41 is reset, all signals, including the drive signal SD3, outputted from the microcomputer 41 become a low level as an inactive level.

The above structure provides the following advantages. The starter 15 can continue to operate to start the engine 13, even if the battery voltage VB decreases to a level low enough to reset the microcomputer 41 due to lack of charge in the battery 20 after the microcomputer 41 performs a switching process (S130, S140, and S150 of FIG. 3) to switch the energization transistor from the transistor T1 to the transistor T2 until the engine 13 reaches the complete explosion state (until the start-up of the engine 13 is completed).

That is, when the microcomputer 41 is reset, the drive signals SD2 and SD3 from the microcomputer 41 become a low level so that the transistors T2 and T3 can be turned OFF. Since the transistor T3 is turned OFF, the transistor T1 is allowed to be turned ON. Therefore, if the user-start signal SUS remains inputted to the ECU 11 at the time when the transistor T1 is allowed to be turned ON, the transistor T1 is turned ON so that the starter 15 can continue to operate. According to the first embodiment, the transistor T1 has a minimum operating voltage lower than that of the transistor T2. Specifically, the transistor T1 can be turned ON, even when the battery voltage VB decreases to a level that prevents the microcomputer 41 from operating.

Further, before performing the switching process (S130, S140, and S150 of FIG. 3), the microcomputer 41 determines whether the previous user-start succeeded in starting the engine 13 (at S120 of FIG. 3). Then, if the microcomputer 41 determines that the previous user-start fails in starting the engine 13 (NO at S120 of FIG. 3), the microcomputer 41 does not perform the switching process.

In such an approach, the microcomputer 41 determines that the previous user-start fails in starting the engine 13 and does not perform the switching process, when the microcomputer 41 is reset at the user-start due to a decrease in the battery voltage VB during a time period from when the microcomputer 41 performs the switching process until the engine 13 reaches the complete explosion state, and then the reset of the microcomputer 41 is released due to an increase in the battery voltage VB.

Therefore, if there is a possibility that the microcomputer 41 is reset immediately after performing the switching process, it is possible to prevent the switching process from being performed again uselessly. In this case, it is ensured that the engine 13 is started by using the transistor T1 designed for the user-start.

It is noted that when the previous user-start fails in starting the engine 13, there is a possibility that the driver intentionally stops the start-up of the engine 13. Therefore, the microcomputer 41 does not perform a fail-safe process when the microcomputer 41 determines that the previous user-start fails in starting the engine 13.

Further, according to the first embodiment, the microcomputer 41 determines whether the monitor signal SM from the comparator 55 is at a high level. In such an approach, it is possible to detect the ON-failure immediately after the user-start is completed. Then, when the ON-failure of the transistor T2 is detected, the microcomputer 41 performs the fail-safe process FS2, thereby disabling the idle-stop function, performing the alarm procedure, and/or performing the urge procedure. Thus, it is possible to prevent the vehicle from being incapable of running while being stopped on a road.

Further, according to the first embodiment, the transistor T3 can be a so-called small signal transistor, which has a small energization capability. Therefore, increases in the size and cost of the ECU 11 can be reduced.

If the ECU 11 has another transistor for preventing the inhibitor switch 33, which suffers from the ON-failure, from being turned ON, the other transistor can be used as the transistor T3.

Correspondence between terms used in the first embodiment and claims is as follows. The coil 29 of the relay 27 and the first solenoid coil 23 of the starter 15 correspond to an electrical load to cause a starter to crank and start an engine. The key switch 31 and the inhibitor switch 33 correspond to a signal output circuit for outputting a user-start signal. The microcomputer 41 corresponds to an idle-stop controller. The transistor T1 corresponds to a user-start circuit. The transistor T2 corresponds to an auto-start circuit. Each of turning ON the transistor T1 and turning ON the transistor T2 corresponds to an energization action to energize an electrical load.

The microcomputer 41 and the transistor T3 correspond to a switch circuit. The transistor T3 corresponds to an interruption circuit. The microcomputer 41 also corresponds to a failure detection circuit. The microcomputer 41 serves as the switch circuit by performing S130, S140, and S150 of the failure detection process shown in FIG. 3. The microcomputer 41 serves as the failure detection circuit by performing S230 of the failure detection process shown in FIG. 3. The microcomputer 41 also corresponds to a release circuit and a prohibition circuit. The microcomputer 41 serves as the release circuit by performing S260 of the failure detection process shown in FIG. 3. The microcomputer 41 serves as the prohibition circuit by performing S250 of the failure detection process shown in FIG. 3.

Second Embodiment

A second embodiment of the present disclosure is described below with reference to FIGS. 6 and 7. A difference of the second embodiment from the first embodiment is as follows.

Figure 6:
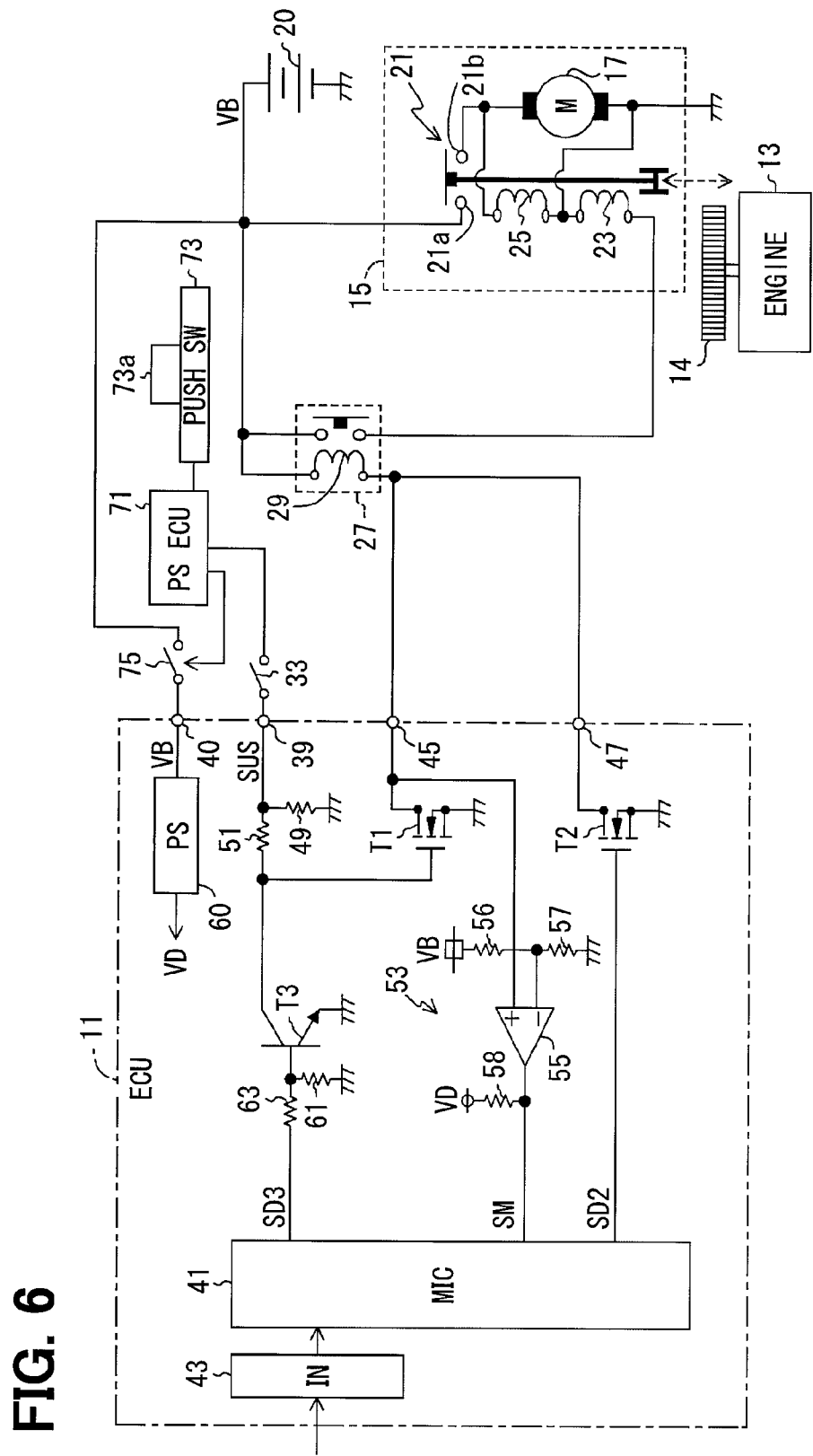
FIG. 6 is a diagram illustrating an ECU according to a second embodiment of the present disclosure.

As shown in FIG. 6, the ECU 11 has the same hardware structure between the first embodiment and the second embodiment. According to the second embodiment, the ECU 11 is mounted on a push-switch-type vehicle that does have the ignition key cylinder and the key switch 31. Instead, the push-switch-type vehicle has a push switch 73 operated by the driver to start the engine 13. The push switch 73 includes a push button 73a and is turned ON when the push button 73a is pushed down.

The push-switch-type vehicle is equipped with an electronic control unit (hereinafter referred to as the "power ECU") 71. In accordance with combinations of operations of the push switch 73, the brake pedal, and/or the like performed by the user, the power ECU 71 controls ON/OFF of an ignition power supply and the accessory power supply and outputs the user-start signal SUS.

For example, when the driver performs a start-up operation that pushes the push button 73a of the push switch 73 while depressing the brake pedal, the power ECU 71 turns ON a switch 75 for connecting a line of the ignition power supply to the positive terminal of the battery 20. Thus, the power ECU 71 supplies the battery voltage VB to the line of the ignition power supply outputs the user-start signal SUS. Then, when the power ECU 71 detects that the engine 13 reaches the complete explosion state, the power ECU 71 stops outputting the user-start signal SUS.

Therefore, as shown in FIG. 6, the battery voltage VB as the external power source voltage is supplied through the switch 75 to the terminal 40 of the ECU 11, and the user-start signal SUS outputted from the power ECU 71 is inputted through the inhibitor switch 33 to the terminal 39 of the ECU 11.

Another difference of the second embodiment from the first embodiment is that the failure detection process performed by the microcomputer 41 of the ECU 11 does not have S190 of FIG. 3. A reason for this is as follows.

Figure 7:
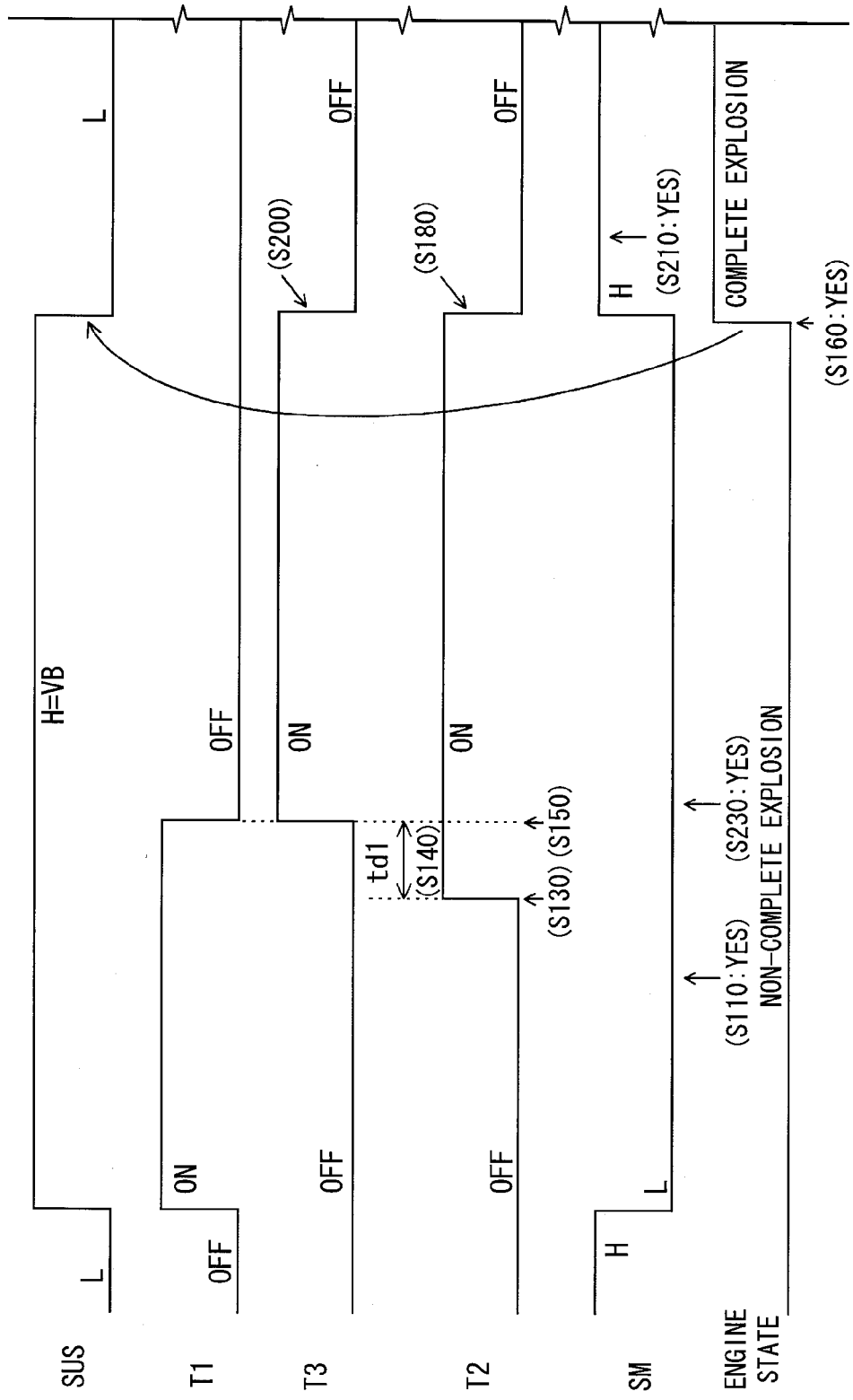
FIG. 7 is a timing chart of the ECU according to the second embodiment.

As shown by a curved arrow in FIG. 7 equivalent to FIG. 4, the power ECU 71 stops outputting the user-start signal SUS immediately after the power ECU 71 detects that the engine 13 reaches the complete explosion state. Therefore, the input of the user-start signal SUS to the ECU 11 has been already removed as of the time when the microcomputer 41 turns OFF the transistor T3 at S200 of FIG. 3 immediately after the microcomputer 41 turns OFF the transistor T2 at S180 of FIG.

3. Therefore, the transistor T1 is not turned ON again. Alternatively, according to the second embodiment, the failure detection process performed by the microcomputer 41 of the ECU 11 can have S190 of FIG. 3.

In the second embodiment, the power ECU 71 and the inhibitor switch 33 correspond to a signal output circuit for outputting a user-start signal.

Third Embodiment

A third embodiment of the present disclosure is described below with reference to FIG. 8. A difference of the third embodiment from the first embodiment is as follows.

Figure 8:
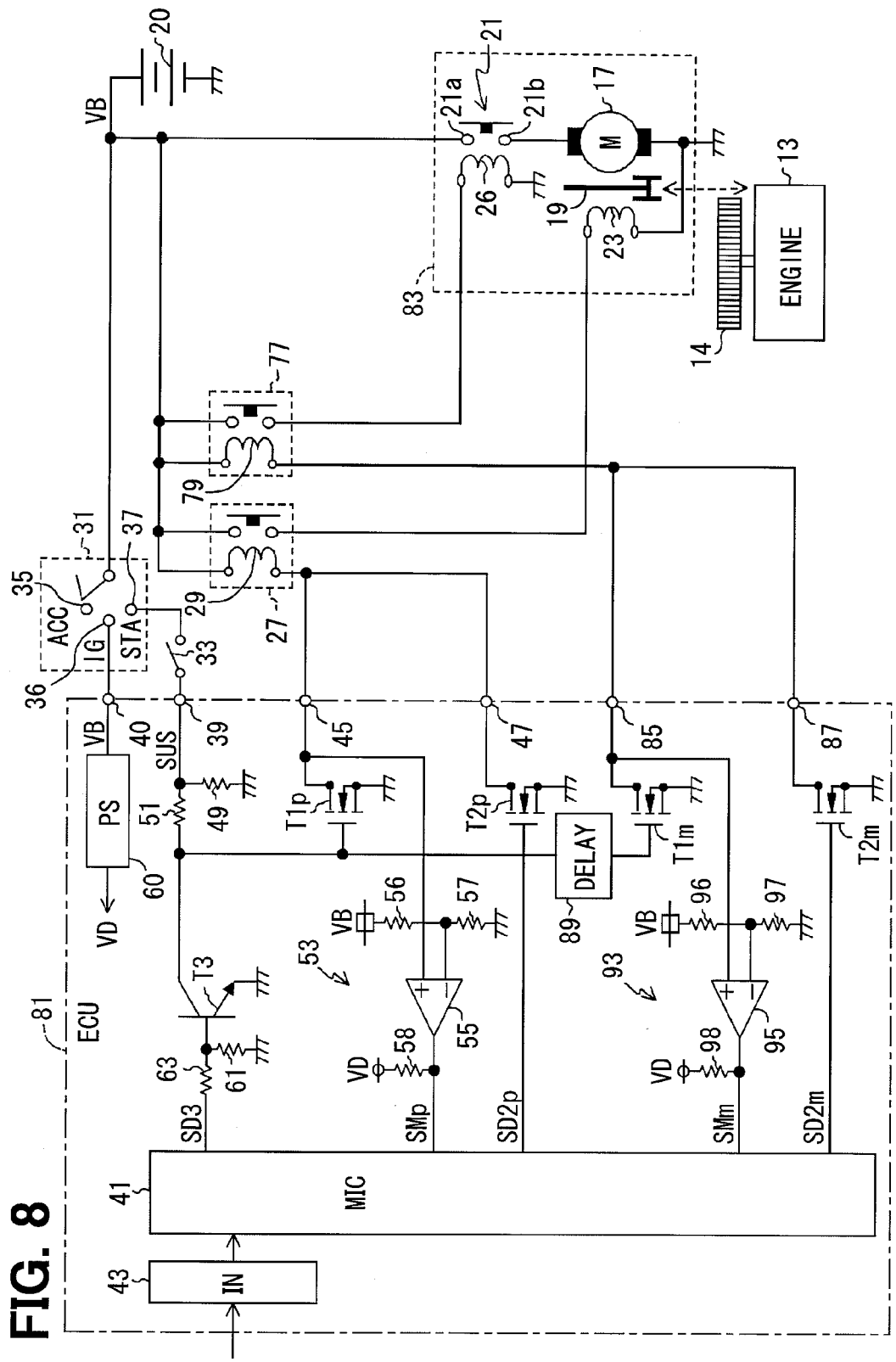
FIG. 8 is a diagram illustrating an ECU according to a third embodiment of the present disclosure.

As shown in FIG. 8, an ECU 81 according to the third embodiment is mounted on a vehicle equipped with a starter 83 instead of the starter 15. The starter 83 can perform a first action and a second action individually. In the first action, the starter 83 causes the pinion gear 19 to mesh with the ring gear 14 of the engine 13. In the second action, the starter 83 energizes (i.e., drives) the motor 17.

Like the starter 15, the starter 83 includes the motor 17, the pinion gear 19, the switch 21, and the first solenoid coil 23. Further, the starter 83 includes a second solenoid coil 26 instead of the second solenoid coil 25.

A first end (i.e., downstream-side end) of the second solenoid coil 26 is connected to the ground line. A second end (i.e., upstream-side end) of the second solenoid coil 26 is disconnected from an energizing path from the switch 21 to the motor 17. The second end of the second solenoid coil 26 is supplied with the battery VB from outside of the starter 83 so that the second solenoid coil 26 can be energized. When the second solenoid coil 26 is energized, the switch 21 is turned ON by electromagnetic force of the second solenoid coil 26. Thus, the first energizing path from the battery 20 to the motor 17 conducts so that the motor 17 can be driven.

Like in the starter 15, in the starter 83, the first end (i.e., downstream-side end) of the first solenoid coil 23 is connected to the ground line, and the second end (i.e., upstream-side end) of the first solenoid coil 23 is supplied with the battery voltage VB so that the first solenoid coil 23 can be energized. When the first solenoid coil 23 is energized, the electromagnetic force of the first solenoid coil 23 causes the pinion gear 19 to move to the mesh position where the pinion gear 19 meshes with the ring gear 14 of the engine 13.

That is, the first solenoid coil 23 is used to cause the pinion gear 19 to mesh with the ring gear 14, and the second solenoid coil 26 is used to drive the motor 17 by turning ON the switch 21. When both the first solenoid coil 23 and the second solenoid coil 26 are energized, the starter 83 operates to crank the engine 13.

Further, in the vehicle, not only the relay 27 for energizing the first solenoid coil 23 of the starter 83 but also a relay 77 for energizing the second solenoid coil 26 of the starter 83 is provided outside the ECU 81.

Specifically, the relay 77 includes a coil 79 and a pair of contacts. A first end (i.e., upstream-side end) of the coil 79 is supplied with the battery voltage VB, and a second end (i.e., downstream-side end) of the coil 79 is grounded (i.e., connected to the ground line) through the ECU 81. The pair of contacts of the relay 77 is provided in a third energizing path from the battery 20 to the first end of the second solenoid coil 26. The relay 77 operates as follows. When the second end (i.e., downstream-side end) of the coil 79 is grounded through the ECU 81 so that the coil 79 can be energized, the pair of contacts of the relay 77 is connected so that a third energizing path from the battery 20 to the second solenoid coil 26 can conduct (i.e., the third energizing path is ON). In contrast, when the coil 79 is de-energized, the pair of contacts is disconnected from each other so that the third energizing path from the battery 20 to the second solenoid coil 26 can be interrupted (i.e., the third energizing path is OFF).

Next, structure of the ECU 81 is described with reference to FIG. 8.

In addition to the components of the ECU 11 of the first embodiment, the ECU 81 includes a terminal 85, a terminal 87, a transistor T1m, a transistor T2m, a delay circuit 89, and a monitor circuit 93. Each of the terminals 85 and 87 is connected to the second end (i.e., downstream-side end) of the coil 79. The transistor T1m is connected between the terminal 85 and the ground line in such a manner that first and second output terminals of the transistor T1m are respectively connected to the terminal 85 and the ground line. The transistor T2m is connected between the terminal 87 and the ground line in such a manner that first and second output terminals of the transistor T2m are respectively connected to the terminal 87 and the ground line.

It is noted that the transistor T1, the transistor T2, the drive signal SD2, and the monitor signal SM of the first embodiment is reworded in the third embodiment as a transistor T1p, a transistor T2p, a drive signal SD2p, and a monitor signal SMp, respectively.

According to the third embodiment, each of the transistors T1m and T2m is a MOSFET. The drain and source of the transistor T1m are respectively connected to the terminal 85 and the ground line. The drain and source of the transistor T2m are respectively connected to the terminal 87 and the ground line.

Therefore, when at least one of the transistors T1m and T2m is turned ON, the second end (i.e., downstream-side end) of the coil 79 of the relay 77 is connected to the ground line so that an electric current can flow through the coil 79. As a result, the relay 77 is turned ON so that the second solenoid coil 26 of the starter 83 can be energized. Thus, the switch 21 is turned ON so that the motor 17 can be driven.

Like in the first embodiment, in the third embodiment, when at least one of the transistors T1p and T2p is turned ON, the electric current flows through the coil 29 so that the relay 27 can be turned ON. As a result, the first solenoid coil 23 of the starter 83 is energized so that the pinion gear 19 can move to the mesh position where the pinion gear 19 meshes with the ring gear 14.

The user-start signal SUS inputted to the terminal 39 of the ECU 81 is inputted through the resistor 51 to the delay circuit 89. The user-start signal SUS is inputted to the delay circuit 89 and outputted from the delay circuit 89 to the gate of the transistor T1m with a predetermined delay time td3. For example, the delay circuit 89 can be mainly constructed with an integrator circuit having a resistor and a capacitor. It is noted that the delay circuit 89 is configured in such a manner that an output signal of the delay circuit 89 becomes 0V immediately when an input signal (i.e., user-start signal SUS) of the delay circuit 89 falls to 0V.

In the ECU 81, therefore, if the transistor T3 remains OFF when the user-start signal SUS is inputted to the terminal 39 in response to the start-up operation performed by the driver, the transistor T1p is turned ON so that the relay 27 can be turned ON. Thus, the pinion gear 19 of the starter 83 moves to the mesh position where the pinion gear 19 meshes with the ring gear 14. Then, when the delay time td3 of the delay circuit 89 elapses after the user-start signal SUS is inputted to the terminal 39, the transistor T1m is turned ON so that the relay 77 is turned ON. When the relay 77 is turned ON, the motor 17 of the starter 83 is driven so that the starter 83 can operate to crank the engine 13.

In this way, the motor 17 is driven after the pinion gear 19 meshes with the ring gear 14. In such an approach, wear or abrasion of the pinion gear 19 and the ring gear 14 can be reduced.

A drive signal SD2*m* from the microcomputer 41 is inputted to the gate of the transistor T2*m*.

The monitor circuit 93 includes a comparator 95, a resistor 96, a resistor 97, and a pull-up resistor 98. A non-inverting input terminal (i.e., positive terminal) of the comparator 95 is connected to the drain of the transistor T1*m* and the terminal 85. The resistors 96 and 97 form a voltage divider. The voltage divider divides the battery voltage VB as the external power source voltage and applies the divided voltage to an inverting input terminal (i.e., negative terminal) of the comparator 95. The divided voltage applied to the inverting input terminal of the comparator 95 acts as a threshold voltage of the comparator 95. For example, according to the third embodiment, the voltage divider constructed with the resistors 96 and 97 divides the battery voltage VB by two. The pull-up resistor 98 is connected between an output terminal of the comparator 95 and a line of the internal power supply voltage VD. An output signal of the comparator 95 is inputted as a monitor signal SMm to the microcomputer 41.

Therefore, when both of the transistors T1*m* and T2*m* are OFF, a voltage of the non-inverting input terminal of the comparator 95 becomes the battery voltage VB, which is greater than the threshold voltage of the comparator 95, so that the monitor signal SMm, which is outputted from the comparator 95 to the microcomputer 41, can become a high level (i.e., become the internal power supply voltage VD). In contrast, when at least one of the transistors T1*m* and T2*m* is ON, the voltage of the non-inverting input terminal of the comparator 95 becomes less than the threshold voltage of the comparator 95 so that the monitor signal SMm, which is outputted from the comparator 95 to the microcomputer 41, can become a low level (i.e., become 0V).

For example, according to the third embodiment, the microcomputer 41 can perform the following process to drive the starter 83 at S108 of the automatic start process shown in FIG. 2B. Firstly, the microcomputer 41 turns ON the transistor T2*p* by changing the drive signal SD2*p* applied to the transistor T2*p* to a high level, so that the pinion gear 19 can move to the mesh position where the pinion gear 19 meshes with the ring gear 14. Then, when a time equivalent to the delay time td3 of the delay circuit 89 elapses, the microcomputer 41 turns ON the transistor T2*m* by changing the drive signal SD2*m* applied to the transistor T2*m* to a high level, so that the motor 17 can be driven.

For example, in a case where the engine 13 is restarted by the starter 83 under a condition that the RPM of the engine 13 is not zero, the microcomputer 41 can perform the following process at S108. Firstly, the microcomputer 41 turns ON the transistor T2*m* by changing the drive signal SD2*m* applied to the transistor T2*m* to a high level, so that the motor 17 can be driven. Then, the microcomputer 41 causes the pinion gear 19 to move to the mesh position by changing the drive signal SD2*p* applied to the transistor T2*p* to a high level in such a manner that a RPM of the pinion gear 19 can become equal to the RPM of the engine 13 when the pinion gear 19 meshes with the ring gear 14.

Then, at S108, upon determination that the engine 13 reaches the complete explosion state, the microcomputer 41 turns OFF the transistors T2*p* and T2*m* by changing the drive signals SD2*p* and SD2*m* to a low level, respectively.

Figure 9:
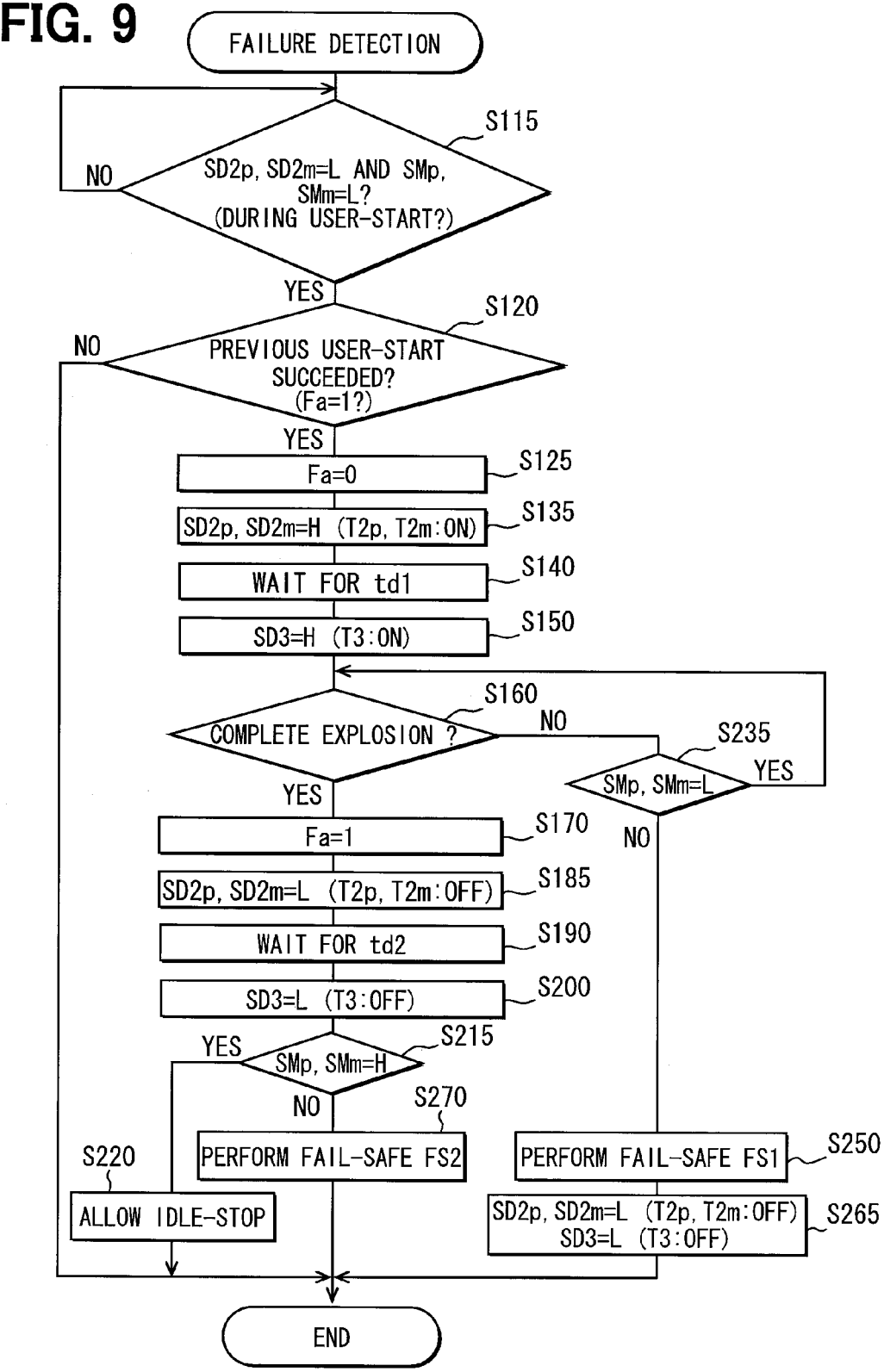
FIG. 9 is a flow chart of a failure detection process performed by the ECU according to the third embodiment.

Further, according to the third embodiment, at the time of the user-start, the microcomputer 41 performs a failure detection process shown in FIG. 9 instead of the failure detection process shown in FIG. 3. When the microcomputer 41 is activated, each of the drive signals SD2*p*, SD2*m*, and SD3 is initially set to a low level.

The failure detection process shown in FIG. 9 differs from the failure detection process shown in FIG. 3 in that S115 replaces S110, S135 replaces S130, S185 replaces S180, S215 replaces S210, S235 replaces S230, and S265 replaces S260. These steps S115, S135, S185, S215, S235, and S265 are described below.

As shown in FIG. 9, the failure detection process starts at S115, where the microcomputer 41 determines whether each of the drive signal SD2*p* applied to the transistor T2*p* and the drive signal SD2*m* applied to the transistor T2*m* is at a low level. Further, at S115, the microcomputer 41 determines whether each of the monitor signal SMp from the comparator 55 and the monitor signal SMm from the comparator 95 is at a low level.

A fact that each of the drive signals SD2*p* and SD2*m* and the monitor signals SMp and SMm is at a low level indicates that the transistors T1*p* and T1*m* are turned ON by the user-start signal SUS. Therefore, if the microcomputer 41 determines that each of the drive signals SD2*p* and SD2*m* and the monitor signals SMp and SMm is at a low level corresponding to YES at S115, the microcomputer 41 determines that it is in the middle of the user-start, and the failure detection process proceeds to S120.

The failure detection process proceeds from S125 to S135, where the microcomputer 41 turns ON the transistors T2*p* and T2*m* by changing the drive signals SD2*p* and SD2*m* to a low level, respectively.

Therefore, even when the drive signal SD3 is changed to a high level at S150 so that the transistor T3 can be turned ON to forcibly turn OFF the transistors T1*p* and T1*m*, the transistors T2*p* and T2*m* remain ON. Accordingly, the relays 27 and 77 remain ON so that the first and second solenoid coils 23 and 26 of the starter 83 can remain energized. It is noted that before the drive signal SD3 is changed to a high level at S150, the first and second solenoid coils 23 and 26 of the starter 83 are energized by the transistors T1*p* and T1*m* that are turned ON in response to the user-start signal SUS.

If the microcomputer 41 does not determine that the engine 13 reaches the complete explosion state corresponding to NO at S160, the failure detection process proceeds to S235. At S235, the microcomputer 41 determines whether each of the monitor signals SMp and SMm is at a low level.

As of S235, when each of the transistors T2*p* and T2*m* is normal (i.e., suffers from no failure), each of the transistors T2*p* and T2*m* remains ON so that each of the monitor signals SMp and SMm can remain at a low level.

Therefore, if the microcomputer 41 determines that each of the monitor signals SMp and SMm is at a low level corresponding to YES at S235, the microcomputer 41 determines that each of the transistors T2*p* and T2*m* remains ON normally, and the failure detection process returns to S160. In contrast, if the microcomputer 41 determines that at least one of the monitor signals SMp and SMm is at a high level corresponding to NO at S235, the microcomputer 41 determines that at least one of the transistors T2*p* and T2*m*, which was turned ON at S135, remains OFF due to the OFF-failure, and the failure detection process proceeds to S250. In this case, if the monitor signal SMp is at a high level, there is a possibility that the transistor T2*p* suffers from the OFF-failure, and if the monitor signal SMm is at a high level, there is a possibility that the transistor T2*m* suffers from the OFF-failure.

The failure detection process proceeds from S250 to S265, where the microcomputer 41 turns OFF the transistors T2*p* and T2m by changing the drive signals SD2p and SD2m to a low level, respectively. Further, at S265, the microcomputer 41 turns OFF the transistor T3 by changing the drive signal SD3 to a low level.

Thus, the transistors T1p and T1m are allowed to be turned ON. Therefore, if the user-start signal SUS remains inputted to the ECU 81 as of S265, the transistors T1p and T1m, which are designed to be used in the user-start, are turned ON so that starter 83 can operate.

If the microcomputer 41 determines that the engine 13 reaches the complete explosion state corresponding to YES at S160, the failure detection process proceeds to S185 through S170. At S185, the microcomputer 41 turns OFF the transistors T2p and T2m by changing the monitor signals SMp and SMm to a low level, respectively. As a result, like in the first embodiment, the starter 83 stops operating.

The failure detection process proceeds from S200 to S215, where the microcomputer 41 determines whether each of the monitor signals SMp and SMm is at a high level.

As of S215, when each of the transistors T2p and T2m is normal (i.e., suffers from no failure), each of the transistors T2p and T2m remains OFF so that each of the monitor signals SMp and SMm can remain at a high level.

Therefore, if the microcomputer 41 determines that each of the monitor signals SMp and SMm is at a high level corresponding to YES at S215, the microcomputer 41 determines that each of the transistors T2p and T2m operates normally (i.e., turned ON and OFF normally), and the failure detection process proceeds to S220. In contrast, if the microcomputer 41 determines that at least one of the monitor signals SMp and SMm is at a low level corresponding to NO at S215, the microcomputer 41 determines that at least one of the transistors T2p and T2m remains ON due to the ON-failure, and the failure detection process proceeds to S270. In this case, if the monitor signal SMp is at a low level, there is a possibility that the transistor T2p suffers from the ON-failure, and if the monitor signal SMm is at a low level, there is a possibility that the transistor T2m suffers from the ON-failure.

Next, effect of the ECU 81 is described.

As shown in FIG. 10, when the user-start signal SUS is inputted to the terminal 39 of the ECU 11 as a result of the start-up operation performed by the driver of the vehicle, the transistor T1p is turned ON. Then, the transistor T1m is turned ON, when the delay time td3 of the delay circuit 89 elapses. Thus, the starter 83 operates to crank the engine 13, and the engine ECU performs fuel injection and ignition for the engine 13.

Further, like in the first embodiment, the microcomputer 41 is activated around the time when the user-start signal SUS is inputted to the ECU 81 and then starts to perform the failure detection process shown in FIG. 9.

Further, in the ECU 81, each of the monitor signals SMp and SMm becomes a low level, because each of the transistors T1p and T1m is turned ON.

Then, when each of the monitor signals SMp and SMm becomes a low level, the microcomputer 41 determines that it is in the middle of the user-start (YES at S115 of FIG. 9) and turns ON the transistors T2p and T2m by changing the drive signals SD2p and SD2m to a high level (at S135 of FIG. 9). Then, when the waiting time td1 elapses (at S140 of FIG. 9), the microcomputer 41 turns ON the transistor T3 by changing the drive signal SD3 to a high level (at S150 of FIG. 9).

As a result, the transistors T1p and T1m are forcibly turned OFF. As of the time when the transistors T1p and T1m are forcibly turned OFF, if the transistors T2p and T2m are normal (i.e., suffer from no failure), the transistors T2p and T2m remain ON. Accordingly, the starter 83 continues to operate, and each of the monitor signals SMp and SMm remains at a low level. Therefore, the microcomputer 41 determines that each of the monitor signals SMp and SMm remains at a low level (YES at S235 of FIG. 9). In this case, the microcomputer 41 determines that the transistors T2p and T2m can be turned ON normally (i.e., determines that each of the transistors T2p and T2m does not suffer from the OFF-failure).

Then, when the engine 13 reaches the complete explosion state, the microcomputer 41 detects that the engine 13 reaches the complete explosion state (YES at S160 of FIG. 9) and turns OFF the transistors T2p and T2m by changing the drive signals SD2p and SD2m to a low level (at S185 of FIG. 9). Then, when the waiting time td2 elapses (at S190 of FIG. 9), the microcomputer 41 turns OFF the transistor T3 by changing the drive signal SD3 to a low level (at S200 of FIG. 9).

When the drive signals SD2p and SD2m become a low level so that the transistors T2p and T2m can be turned OFF, the monitors signal SMp and SMm return to a high level from a low level. Therefore, the microcomputer 41 determines that each of the monitor signals SMp and SMm is at a high level (YES at S215 of FIG. 9). In this case, the microcomputer 41 determines that the transistors T2p and T2m can be turned OFF normally (i.e., determines that each of the transistors T2p and T2m does not suffer the ON-failure).

Although not shown in the drawings, assuming that at least one of the transistors T2p and T2m suffers from the OFF-failure, the microcomputer 41 determines that at least one of the monitor signals SMp and SMm is at a high level (NO at S235 of FIG. 3) and that at least one of the transistors T2p and T2m suffers from the OFF-failure. Then, the microcomputer 41 performs the fail-safe process FS1 (at S250 of FIG. 9).

In this case, since the microcomputer 41 turns OFF the transistor T3 by changing the drive signal SD3 to a low level (at S265 of FIG. 9), the transistors T1p and T1m are released from the forced-OFF state. If the user-start signal SUS remains inputted to the ECU 81 at the time when the transistors T1p and T1m are released from the forced-OFF state, the transistors T1p and T1m are turned ON again so that the starter 83 can operate.

Although not shown in the drawings, assuming that at least one of the transistors T2p and T2m suffers from the ON-failure, even after the microcomputer 41 performs S185, S190, and S200 of FIG. 9, at least one of the monitor signals SMp and SMm remains at a low level. Accordingly, the microcomputer 41 determines that at least one of the monitor signals SMp and SMm remains at a low level corresponding to NO at S215 of FIG. 9. In this case, the microcomputer 41 determines that at least one of the transistors T2p and T2m suffers from the ON-failure and performs the fail-safe process FS2 (at S270 of FIG. 9).

Correspondence between terms used in the third embodiment and claims is as follows. The coil 29 of the relay 27, the first solenoid coil 23 of the starter 83, the coil 79 of the relay 77, the second solenoid coil 26 of the starter 83 correspond to an electrical load to cause a starter to crank and start an engine. The transistors T1p and T1m correspond to a user-start circuit. The transistor T2p and T2m correspond to an auto-start circuit. Each of turning ON the transistors T1p and T1m and turning ON the transistors T2p and T2m corresponds to an energization action to energize an electrical load.

The ECU 81 of the third embodiment can provide the same advantages as the ECU 11 of the first embodiment. The ECU 81 can be mounted on a push-switch-type vehicle in a manner as described in the second embodiment.

The microcomputer 41 serves as the switch circuit by performing S135, S140, and S150 of the failure detection process shown in FIG. 9. The microcomputer 41 serves as the failure detection circuit by performing S235 of the failure detection process shown in FIG. 9. The microcomputer 41 serves as the release circuit by performing S265 of the failure detection process shown in FIG. 9. The microcomputer 41 serves as the prohibition circuit by performing S250 of the failure detection process shown in FIG. 9.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the first embodiment, as shown in FIG. 1, one relay 27 is used not only at the user-start (i.e., the engine 13 is started in response to the start-up operation performed by the driver) but also at the auto-start (i.e., the engine 13 is automatically restarted by the idle-stop function). Therefore, each of the transistor T1 designed for the user-start and the transistor T2 designed for the auto-start is connected to the coil 29 of the relay 27.

Alternatively, a user-start relay which is turned ON by the transistor T1 can be a separate piece from an auto-start relay which is turned ON by the transistor T2. In this case, the embodiments are modified as described in (1)-(5).

(1) Two parallel energization paths are provided from the battery 20 to the second end (i.e., upstream side-end) of the first solenoid coil 23. One energization path conducts when a pair of contacts of the user-start relay is connected, and the other energization path conducts when a pair of contacts of the auto-start relay is connected. Thus, at least one of the user-start relay and the auto-start relay is turned ON, the first solenoid coil 23 can be energized.

(2) A downstream-side end, opposite from a battery-voltage-VB-side end, of a coil of the user-start relay is connected to the drain of the transistor T1. Likewise, a downstream-side end, opposite from a battery-voltage-VB-side end, of a coil of the auto-start relay is connected to the drain of the transistor T2. Thus, when the transistor T1 is turned ON, the user-start relay is turned ON, and when the transistor T2 is turned ON, the auto-start relay is turned ON.

(3) The monitor circuit 53 monitors a voltage of the upstream-side end of the first solenoid coil 23 and outputs a monitor signal SM to the microcomputer 41. The monitor signal SM indicates whether the battery voltage VB is supplied to the upstream-side end of the first solenoid coil 23.

(4) At S230 of FIG. 3, the microcomputer 41 determines whether the monitor signal SM is at an ON level indicating that the battery voltage VB is supplied to the upstream-side end of the first solenoid coil 23. If the monitor signal SM is not at the ON level corresponding to NO at S230, the microcomputer 41 determines that the transistor T2 or the auto-start relay suffers from the OFF failure, and the failure detection process proceeds to S250.

(5) At S210 of FIG. 3, the microcomputer 41 determines whether the monitor signal SM is at an OFF level indicating that the battery voltage VB is not supplied to the upstream-side end of the first solenoid coil 23. If the monitor signal SM is not at the OFF level corresponding to NO at S210, the microcomputer 41 determines that the transistor T2 or the auto-start relay suffers from the ON failure, and the failure detection process proceeds to S270.

In this modification, the first solenoid coil 23 corresponds to an electrical load to cause a starter to crank and start an engine, the transistor T1 and the user-start relay correspond to a user-start circuit, and the transistor T2 and the auto-start relay correspond to an auto-start circuit.

The above modification can be applied to the other embodiments. In the third embodiment, a user-start relay which is turned ON by the transistor T1$p$ can be a separate piece from an auto-start relay which is turned ON by the transistor T2$p$, and a user-start relay which is turned ON by the transistor T1$m$ can be a separate piece from an auto-start relay which is turned ON by the transistor T2$m$.

The transistors T1, T1$p$, T1$m$, T2, T2$p$, and T2$m$ can be transistors other than MOSFETs. For example, the transistors T1, T1$p$, T1$m$, T2, T2$p$, and T2$m$ can be bipolar transistors or IGBTs. The transistor T3 can be a transistor other than a bipolar transistor. For example, the transistor T3 can be a MOSFET or IGBT. A dedicated integrated circuit (IC) can be used instead of the microcomputer 41.

What is claimed is:

1. A starter controller for a vehicle equipped with an electrical load, a starter, a signal output circuit, and an idle-stop controller, the starter configured to crank and start an engine of the vehicle when the electrical load is energized, the signal output circuit configured to output a user-start signal in response to a user start-up operation performed to start the engine by a driver of the vehicle, the idle-stop controller configured to stop the engine when a predetermined automatic stop condition is met during operation of the engine, the idle-stop controller configured to restart the engine when a predetermined automatic start condition is met, the starter controller comprising:
   a user-start circuit configured to receive the user-start signal and perform an energization action to energize the electrical load and subsequently drive the starter upon reception of the user-start signal from the signal output circuit;
   an auto-start circuit configured to perform the energization action and subsequently energize the electrical load when the idle-stop controller restarts the engine;
   a switch circuit configured to switch an energization circuit which energizes the electrical load from the user-start circuit to the auto-start circuit after the user-start circuit starts the energization action upon reception of the user-start signal from the signal output circuit, wherein the switch circuit causes the auto-start circuit to perform the energization action and puts the user-start circuit into a forced state where the user-start circuit is forced to stop the energization action; and
   a failure detection circuit configured to determine whether the auto-start circuit performs the energization action when the switch circuit switches the energization circuit from the user-start circuit to the auto-start circuit and accordingly returns the user-start circuit into a normal state where the user-start circuit performs the energization action upon reception of the user-start signal.

2. The starter controller according to claim 1, further comprising:
   a release circuit configured to return the user-start circuit into the normal state by releasing the switching caused by the switch circuit when the failure detection circuit determines that the auto-start circuit does not perform the energization action.

3. The starter controller according to claim 1, further comprising:
   an idle-stop prohibition circuit configured to prohibit the idle-stop controller from stopping the engine when the failure detection circuit determines that the auto-start circuit does not perform the energization action.

4. The starter controller according to claim 2, further comprising:
an idle-stop prohibition circuit configured to prohibit the idle-stop controller from stopping the engine when the failure detection circuit determines that the auto-start circuit does not perform the energization action.

5. The starter controller according to claim 1, wherein
the switch circuit includes a microcomputer configured to output a drive signal and an interruption circuit configured to receive the drive signal,
when the drive signal becomes an active level, the interruption circuit puts the user-start circuit into the forced state by interrupting supply of the user-start signal to the user-start circuit,
the microcomputer causes the auto-start circuit to perform the energization action and switches the energization circuit from the user-start circuit to the auto-start circuit by changing the drive signal to the active level upon detection that the user-start circuit starts the energization action, and
when the microcomputer is reset, the drive signal becomes an inactive level.

6. The starter controller according to claim 2, wherein
the switch circuit includes a microcomputer configured to output a drive signal and an interruption circuit configured to receive the drive signal,
when the drive signal becomes an active level, the interruption circuit puts the user-start circuit into the forced state by interrupting supply of the user-start signal to the user-start circuit,
the microcomputer causes the auto-start circuit to perform the energization action and switches the energization circuit from the user-start circuit to the auto-start circuit by changing the drive signal to the active level upon detection that the user-start circuit starts the energization action, and
when the microcomputer is reset, the drive signal becomes an inactive level.

7. The starter controller according to claim 3, wherein
the switch circuit includes a microcomputer configured to output a drive signal and an interruption circuit configured to receive the drive signal,
when the drive signal becomes an active level, the interruption circuit puts the user-start circuit into the forced state by interrupting supply of the user-start signal to the user-start circuit,
the microcomputer causes the auto-start circuit to perform the energization action and switches the energization circuit from the user-start circuit to the auto-start circuit by changing the drive signal to the active level upon detection that the user-start circuit starts the energization action, and
when the microcomputer is reset, the drive signal becomes an inactive level.

8. The starter controller according to claim 4, wherein
the switch circuit includes a microcomputer configured to output a drive signal and an interruption circuit configured to receive the drive signal,
when the drive signal becomes an active level, the interruption circuit puts the user-start circuit into the forced state by interrupting supply of the user-start signal to the user-start circuit,
the microcomputer causes the auto-start circuit to perform the energization action and switches the energization circuit from the user-start circuit to the auto-start circuit by changing the drive signal to the active level upon detection that the user-start circuit starts the energization action, and
when the microcomputer is reset, the drive signal becomes an inactive level.

\* \* \* \* \*